(12) United States Patent
Rojas et al.

(10) Patent No.: US 8,113,841 B2
(45) Date of Patent: Feb. 14, 2012

(54) READING DEVICE FOR BLIND OR VISUALLY IMPAIRED PERSONS

(75) Inventors: Raul Rojas, Berlin (DE); Cüneyt Göktekin, Potsdam (DE); Oliver Tenchio, Potsdam (DE)

(73) Assignee: Beyo GmbH, Potsdam (DE)

( * ) Notice: Subject to any disclaimer, the term of this patent is extended or adjusted under 35 U.S.C. 154(b) by 538 days.

(21) Appl. No.: 12/276,266

(22) Filed: Nov. 21, 2008

(65) Prior Publication Data

US 2009/0186321 A1 Jul. 23, 2009

Related U.S. Application Data

(60) Provisional application No. 60/991,635, filed on Nov. 30, 2007.

(51) Int. Cl.
*G09B 21/00* (2006.01)
(52) U.S. Cl. ......... 434/114; 382/114; 434/112; 434/113
(58) Field of Classification Search .................. 382/114; 434/112, 116
See application file for complete search history.

(56) References Cited

U.S. PATENT DOCUMENTS

| | | | |
|---|---|---|---|
| 7,868,367 B2 * | 1/2011 | Hong et al. | 257/292 |
| 2003/0195749 A1 | 10/2003 | Schuller | |
| 2006/0017810 A1 * | 1/2006 | Kurzweil et al. | 348/207.1 |
| 2006/0106432 A1 * | 5/2006 | Sawan et al. | 607/54 |
| 2011/0071418 A1 * | 3/2011 | Stellar et al. | 600/546 |

FOREIGN PATENT DOCUMENTS

| | | |
|---|---|---|
| EP | 0952533 | 10/1999 |
| WO | WO-03/021374 | 3/2003 |
| WO | WO-2005/064571 | 7/2005 |
| WO | WO-2006/074993 | 7/2006 |

OTHER PUBLICATIONS

Adams-Spink, Geoff, Reading "to go" for Blind People, BBC News website, Jan. 22, 2007.
Munson, John H., System Study of a Dial-Up Text Reading Service for the Blind, Stanford Research Institute, pp. 228-239.
Savoie, Rob and Erickson, Pat; Experimental Simulation of an Optical Character Recognition, Speech Output reading Machine for the Blind, Telesensory Systems, Inc., Palo Alto, California, pp. 30-35.

(Continued)

*Primary Examiner* — Nikolai A Gishnock
*Assistant Examiner* — Randall N Crenwelge
(74) *Attorney, Agent, or Firm* — Mark M. Friedman

(57) ABSTRACT

A reading device for blind or visually impaired persons for recognizing and reading text passages comprises an image capturing unit being configured to capture an image of an environment of a blind or visually impaired person and to output image data corresponding thereto, an image processing unit being configured to process the image data such that text is recognized and extracted from the image data and to output text data corresponding thereto, a text outputting unit being configured to output data corresponding to the text data in a form noticeable or convertable to be noticeable by the blind or visually impaired person, and a housing comprising a first part and a second part, the first part having the image capturing unit attached thereto and the second part accommodating the image processing unit and the text outputting unit.

30 Claims, 24 Drawing Sheets

OTHER PUBLICATIONS

Gesundheit, Das Magazin dr Bertelsman BKK, Intelligente Lesebrille fur Blinde, Dec. 2005, pp. 56-58.
Innovation; Intelligente Les-brille fur Blinde, pp. 63-64.
Mhplusdu, Lesebrille fur Blinde, Aug. 2005, pp. 59-62.
Brille ersetzt Blindenhund, Feb. 13, 1997, http://informatik.uni-hamurg.de/.
Mit Brille und PC ins Museum, Wearable Computing, Sep. 9, 2000.
Heitmuller, Lars. M., Innovation "Made in Germany": Brille lasst Blinde lesen, p. 54.
Rubrik, Wissenschaft & Gesundheit, Lesebrille fur Blinde, p. 55.
European Search Report, referencing application No. 07122042.0-2221, dated Mar. 7, 2008.

* cited by examiner

READING DEVICE FOR BLIND OR VISUALLY IMPAIRED PERSONS

TECHNICAL FIELD

The present invention relates to a reading device which is especially suitable for blind or visually impaired persons to recognize and read text passages present in the environment of blind or visually impaired persons.

BACKGROUND ART

In Germany there are about 150,000 blind persons and about 500,000 visually impaired persons. Worldwide there are about 160 millions blind or visually impaired persons. Ordinary activities, such as shopping at supermarket or use of public transport, are often an insurmountable obstacle for these persons since most part of information relevant for such activities is available only in written form. A general technical approach for overcoming such problems is the provision of computer-based assistance systems which can be used as reading aid by blind or visually impaired persons.

However, until now most available reading systems do not support mobility and, therefore, have limited usefulness in everyday life. Despite of apparent great demand until now advancing miniaturization of computer technology has merely used sporadic for development of mobile reading devices for blind or visually impaired persons. In few cases in which this has been done such assistance systems require a considerable degree of assistance and handling of a user to offer a sufficient degree of assistance even under partly suboptimal environmental conditions.

In currently available reading devices the blind or visually impaired person has to put the object containing text into a scanner or has to move a capturing device such as a digital camera or a portable scanner across the object to be detected. However, this is not always possible since objects such as timetables, packages, books or the like can partly not be scanned with sufficient quality. If a digital camera or a portable scanner is used the user has to bring the objects to be detected to the digital camera or the portable scanner or has to bring the digital camera or the portable scanner to the objects to be detected. In mobile use this is only possible in a limited manner since the user on the one hand does not always know where a object to be detected is present and on the other hand does not always have hands free to perform required actions Reading devices for blind or visually impaired persons are often available in libraries and are also sold for use at home. However, often the operation of buttons and switches is an insurmountable obstacle for blind or visually impaired persons.

From WO 2005/096760 A2 there are known reading devices for blind or visually impaired persons. In more detail, this document discloses portable reading devices and corresponding methods in general form and also discloses which diversity of technical requirements must be considered in designing such portable reading devices and which diversity of approaches are available for a promising product.

However, this document is fully silent about how to put the technical requirements into practice and how to realize an overall working technical solution from such technical requirements. Furthermore, the specific technical requirements are directed to portable reading devices which require assistance from a user in a considerable manner.

DISCLOSURE OF INVENTION

It is therefore the object of the present invention to provide a reading device for assisting blind or visually impaired persons, which reading device is autonomous and does almost not require assistance from a user.

This object is solved by the measures indicated in claims 1, 14 and 25.

According to a first aspect, a reading device for blind or visually impaired persons for recognizing and reading text passages comprises an image capturing unit being configured to capture an image of an environment of a blind or visually impaired person and to output image data corresponding thereto, an image processing unit being configured to process the image data such that text is recognized and extracted from the image data and to output text data corresponding thereto, a text outputting unit being configured to output data corresponding to the text data in a form noticeable or convertible to be noticeable by the blind or visually impaired person, a housing comprising a first part and a second part, the first part having the image capturing unit attached thereto and the second part accommodating the image processing unit and the text outputting unit, and an adjusting unit coupling the first part and the second part of the housing with each other and being configured to define an operating position in which the first part of the housing is spaced apart the second part of the housing and a non-operating position in which the first part of the housing abuts against the second part of the housing to accommodate the image capturing unit, the image processing unit and the text outputting unit in the housing.

Preferably, the housing comprises a third part rotatably attached to the second part of the housing and configured to define a support of the housing.

Preferably, the adjusting unit is a telescopic pullout configured to slidably adjust a position of the first part of the housing.

Preferably, an amount of slidable adjustment of the position of the first part of the housing defines a size of a capturing area of the image capturing unit in the operating position.

Preferably, operating switches are present at the second part of the housing.

Preferably, the image capturing unit is a camera module.

Preferably, the camera module is an array comprising a plurality of CCD or CMOS modules.

Preferably, the image capturing unit is movable.

Preferably, control of operation is performed by at least one of speech and gesture.

Preferably, the image capturing unit is configured to capture individual pictures of an environment of the blind or visually impaired person.

Preferably, the image capturing unit is configured to capture video streams of an environment of the blind or visually impaired person.

Preferably, the image processing unit is configured to perform the step of locating potential text objects in captured video streams and tracking the potential text objects in a time-varying scene of the captured video streams.

Preferably, the image processing unit is configured to perform stitching of a plural images captured by the image capturing unit to form an overall and a high-resolution image.

According to a second aspect, a reading device for blind or visually impaired persons for recognizing and reading text passages comprises an image capturing unit being configured to capture an image of an environment of a blind or visually impaired person and to output image data corresponding thereto, an image processing unit being configured to process the image data such that text is recognized and extracted from the image data and to output text data corresponding thereto, a text outputting unit being configured to output data corresponding to the text data in a form noticeable or convertible to be noticeable by the blind or visually impaired person, and a carrying unit, configured to be carried on a body of the blind or visually impaired person, comprising a first part and a second part, the first part having the image capturing unit attached thereto such that an capturing area of the image capturing unit is movable in relation to the first part and the second part accommodating the image processing unit and the text outputting unit.

Preferably, the first part of the carrying unit has the form of eye glasses.

Preferably, the second part of the carrying unit is configured to be carried at a belt of the blind or visually impaired person.

Preferably, operating switches are present at the second part of the carrying unit.

Preferably, the image capturing unit is a camera module.

Preferably, the camera module is an array comprising a plurality of CCD or CMOS modules.

Preferably, control of operation is performed by at least one of speech and gesture.

Preferably, the image capturing unit is configured to capture individual pictures of an environment of the blind or visually impaired person.

Preferably, the image capturing unit is configured to capture video streams of an environment of the blind or visually impaired person.

Preferably, the image processing unit is configured to perform the step of locating potential text objects in captured video streams and tracking the potential text objects in a time-varying scene of the captured video streams.

Preferably, the image processing unit is configured to perform stitching of a plural images captured by the image capturing unit to form an overall and a high-resolution image.

According to a third aspect, a reading device for blind or visually impaired persons for recognizing and reading text passages comprises an image capturing unit being configured to capture an image of an environment of a blind or visually impaired person and to output image data corresponding thereto, an image processing unit being configured to process the image data such that text is recognized and extracted from the image data and to output text data corresponding thereto, and a text outputting unit being configured to output data corresponding to the text data in a form noticeable or convertable to be noticeable by the blind or visually impaired person, wherein the image processing unit is configured to assign features to recognized text objects for allowing semantic assignment of the recognized text objects to an assumed layout structure.

Preferably, the assumed layout structure is derived from spatial arrangement of the recognized text objects based on template-based heuristics.

Preferably, templates are stored in a database.

Preferably, templates define a geometric arrangement of possible text objects.

Preferably, the recognized text objects are subject to unwarping.

Preferably, the reading device comprises a housing comprising a first part and a second part, the first part having the image capturing unit attached thereto and the second part accommodating the image processing unit and the text outputting unit, and an adjusting unit coupling the first part and the second part of the housing with each other and being configured to define an operating position in which the first part of the housing is spaced apart the second part of the housing and a non-operating position in which the first part of the housing abuts against the second part of the housing to accommodate the image capturing unit, the image processing unit and the text outputting unit in the housing.

Preferably, the housing comprises a third part rotatably attached to the second part of the housing and configured to define a support of the housing.

Preferably, the adjusting unit is a telescopic pullout configured to slidably adjust a position of the first part of the housing.

Preferably, an amount of slidable adjustment of the position of the first part of the housing defines a size of a capturing area of the image capturing unit in the operating position.

Preferably, operating switches are present at the second part of the housing.

Preferably, the reading device comprises a carrying unit, configured to be carried on a body of the blind or visually impaired person, comprising a first part and a second part, the first part having the image capturing unit attached thereto such that a capturing area of the image capturing unit is movable in relation to the first part and the second part accommodating the image processing unit and the text outputting unit.

Preferably, the first part of the carrying unit has the form of eye glasses.

Preferably, the second part of the carrying unit is configured to be carried at a belt of the blind or visually impaired person.

Preferably, operating switches are present at the second part of the carrying unit.

Preferably, the image capturing unit is a camera module.

Preferably, the camera module is an array comprising a plurality of CCD or CMOS modules.

Preferably, the image capturing unit is movable.

Preferably, control of operation is performed by at least one of speech and gesture.

Preferably, the image capturing unit is configured to capture individual pictures of an environment of the blind or visually impaired person.

Preferably, the image capturing unit is configured to capture video streams of an environment of the blind or visually impaired person.

Preferably, the image processing unit is configured to perform the step of locating potential text objects in captured video streams and tracking the potential text objects in a time-varying scene of the captured video streams.

Preferably, the image processing unit is configured to perform stitching of a plural images captured by the image capturing unit to form an overall and a high-resolution image.

Furthermore, all possible technically feasible combinations of the aforementioned features are also part of the present invention.

BRIEF DESCRIPTION OF FIGURES IN THE DRAWING

The present invention will be described below on the basis of specific embodiments with reference to the accompanying drawing, in which.

MODES FOR CARRYING OUT THE INVENTION

Figure 1:
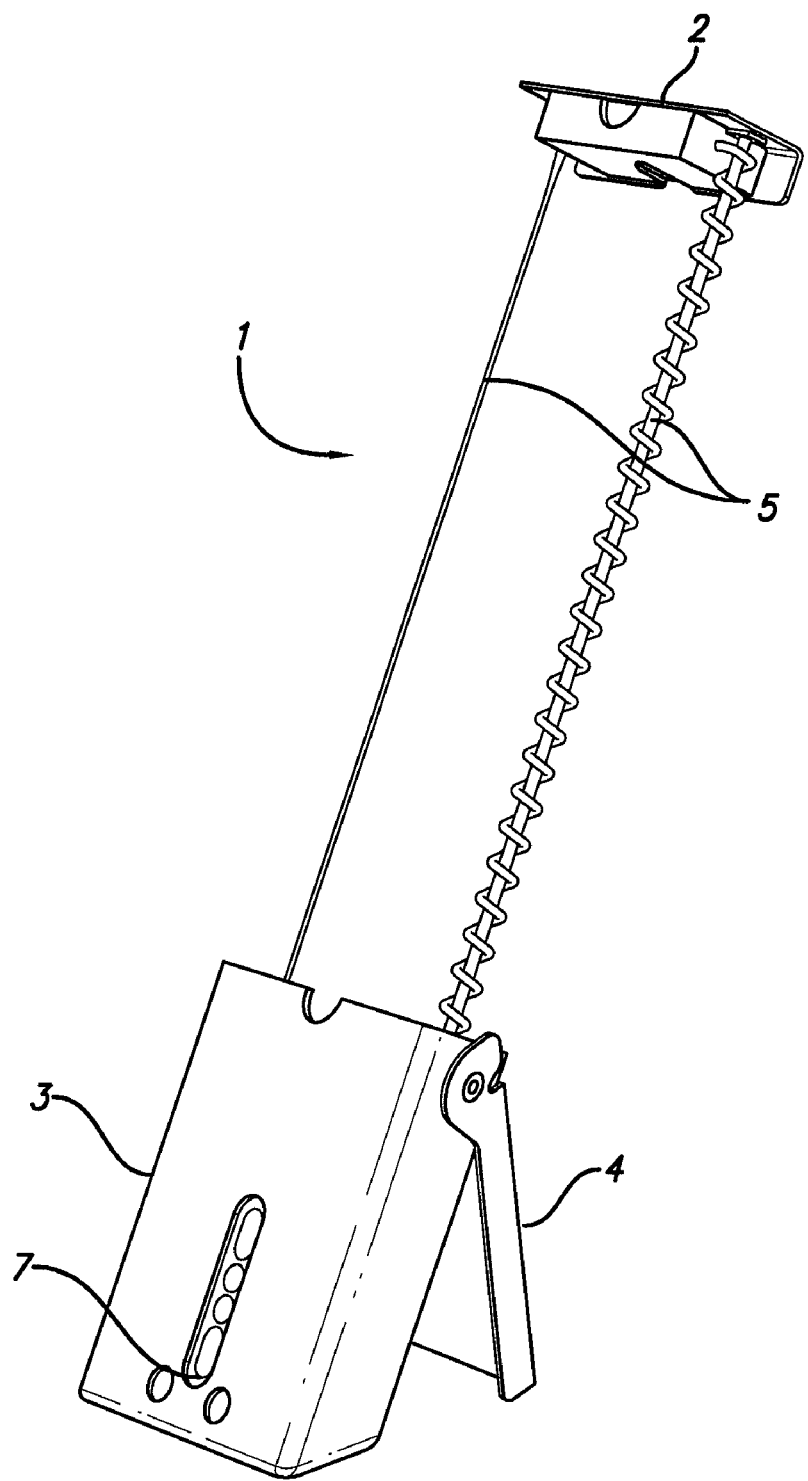
FIG. 1 is a perspective view of a reading device according to an embodiment of the present invention in an operating position.

Reference will now be made in detail to some embodiments of the present invention, examples of which are illustrated in the accompanying drawing.

The reading devices for blind or visually impaired persons described below facilitate such handicapped persons in participating in public living in an autonomous manner. The reading devices have high compactness and high mobility and are extremely easy to handle as compared with reading devices of the prior art.

An essential feature of the reading devices is to overcome difficulties that text contents to be recognized and processed have to be presented to reading devices of the prior art in more or less conditioned form to obtain satisfactory results by a reading function. The requirements or possibilities of conditioning of image contents for assisting an optimal reading function are various and relate to general aspects such as positioning, illumination, focusing or the like but also to specific aspects of an intelligent image or text recognition such as pattern recognition, equalization or unwarping, layout recognition, text orientation, speech recognition or the like. Optimal use of such aspects in a coherent pre-processing method serves for preparation of actual core functions of the reading devices, i.e. OCR (optical character recognition) and subsequent speech synthesis on the basis of recognized text information. If it is assumed that top-quality OCR and speech synthesis technologies are available, reading quality of the reading devices finally depends essentially on optimized capturing and pre-processing of raw image data.

The intended users of such reading devices as blind or visually impaired persons have in the first place the handicap of being not able to assist such pre-processing in an optimal manner. Therefore, the reading devices are able to pay attention to all aspects of pre-processing and do therefore merely require none or few assistance of the intended users.

Qualitative improvement of performance of such reading devices is achieved by autonomous properties and by integrated, adaptive and self-optimizing pre-processing which takes burden from the user as regards common handling and operating functions.

The reading devices described below are autonomous assistance systems comprising computer hardware and software and which independently visually search for, recognize and condition relevant objects in an environment of a blind or visually impaired person such as signs, letters, books, news papers or the like and then reproduce such information regarding such relevant objects such as text contained on the relevant objects in an acoustic manner, preferably in natural speech. The reading devices are extremely compact and modular in construction so that they can easily be used in different configurations, such as a tabletop unit or eye glasses as described below in more detail, for mobile scenes. The control of operation of the reading devices is advantageously achieved by at least one of speech or gesture. Alternately, a simple operating part allows inconspicuous operation of the reading devices in public.

Operating the reading devices is extremely easy. If a user brings the reading devices in operational readiness, the reading devices will operate autonomous. i.e. the environment is searched for suitable objects and the user is informed about recognized objects such as signs, news papers, letters, books or the like. Either the user decides from which recognized objects contents should be reproduced or the reading devices are placed in a condition to automatically recognize, process and read specific object types, such as only letters. In the latter case, after entering operational readiness, the reading devices search the environment only for the specific objects, such as only letters, and reproduce their contents for example on demand.

The reading devices for blind or visually impaired persons are suitable for use in everyday situations and are also suitable for mobile use. Thus, the reading devices are suitable as reading assistance not only at home for example to read a news paper but also as reading assistance on the way to read road signs, product labels, an announcement at a train station or the like.

The reading devices do not require a user-operated system but use a system-operated assistance of the user as intuitively corresponds to the need of intended users during normal operation. This essential feature is furthermore supported by potential speech and/or gesture controlled operability of the reading devices, which allows for simplified navigation through all essential functions and options of the reading devices.

An essential qualitative feature in using the reading devices is the ability to provide an optimal text recognition result even under suboptimal environmental conditions. The autonomous reading devices are able to form optimal operating conditions by themselves. Here, pre-processing plays an important role. Pre-processing is achieved by sophisticated image processing methods, the combination of which has a coherent, adaptive and self-optimizing character.

A further essential feature of the reading devices is the ability to automatically recognize a plurality of layouts of news papers, letters, tables or the like. Considering of document layout leads to an improved ability of interpretation and navigation of text information. Text is present on different objects such as signs, labels of bottles, packages, timetables or the like. It is obvious that in recognizing a letter other processes have to be performed as in for example recognizing timetables. In case of a letter recognizing the layout rapidly locates the sender of the letter and in case of timetables directions, stations, times of departure or the like are rapidly recognized.

Hereinafter, configurations of embodiments of the present inventions and modifications thereof will be described in detail.

In general, a hardware of the reading devices described below comprises a PC (personal computer) compatible computing module having a suitable interface with a specific camera module. Through this interface it is possible to send a series of control commands to the camera module to, for example, perform illumination, image and other adjustments or to switch between a photo mode and a video mode of the camera module. On the contrary, status information and photo and video data in different resolutions and formats from the camera module are received by the computing module through the interface.

The mobile autonomous reading devices require the use of a lightweight and compact camera module. On the contrary, the mobile autonomous reading devices require a large field of view, i.e. capturing area of the camera module, to ensure maximal independency of the mobile autonomous reading devices from the line of sight of a blind or visually impaired person who uses the mobile autonomous reading devices. Capturing an image of the whole field of view of the mobile autonomous reading devices has to be performed with a high pixel resolution to ensure independency from the distance of objects and to be able to subject more distant objects OCR processing with good results. The camera module uses CCD and CMOS camera technology which addresses such problems. As the camera module, CCD and CMOS cameras are used which comprise 8 or more megapixel, a zoom function, an autofocus function and a integrated intelligent control.

A reference scene of an ideal camera module allows for detecting a whole work space of a standard desktop in maximized resolution from a distance of about 1.2 m. The quality, i.e. resolution, of a field of view taken from such reference scene should be such that a text object having a text of a font size of 11 points may be barely OCR processed with good quality. This required field of view of the camera module is however already to large to be detected using available and affordable CCD or CMOS technology. Therefore, for surely detecting or capturing of all text objects the field of view is initially divided in smaller fields of view. These smaller fields of view on the one hand cover the whole field of view and on the other hand comprise sufficient overlapping such that subsequent merging of a whole scene or of parts thereof is possible across limits of the field of view.

The camera module used herein solves this problem by using either an array of CCD or CMOS modules or alternatively a single movable CCD or CMOS spot. Movability of the last mentioned CCD or CMOS spot is effected either directly or indirectly in an autonomous manner such that a so-called saccade is performed autonomously by the camera module. The saccade may be considered as a fixed predetermined pattern of movement which is passed through by the CCD or CMOS spot, to simulate a configuration of the first mentioned CCD or CMOS array. In direct generating of a saccade the camera module as such is moved and in indirect generating of a saccade optical elements such as a mirror for redirecting a field of view of the CCD or CMOS spot is moved. There is also the possibility to use a CCD or CMOS module having a freely movable CCD or CMOS spot which can be directed to a specific object of the field of view using maximum resolution instead of having a fixed predetermined saccade. Furthermore, it should be noted that control of operation of CCD or CMOS modules or CCD or CMOS arrays can be performed using a predetermined scheme, for example sequentially, or may be performed in an arbitrary manner, for example a zig-zag shape or a sequencing manner. In addition, control of operation of CCD or CMOS modules or CCD or CMOS arrays as can be performed in such a manner that a resultant field of view is focused on relevant objects to be detected in a stationary or time-varying manner.

Whilst the CDD or CMOS array detects the scene to be considered simultaneously using plural CCD or CMOS modules, the movable CCD oder CMOS spot is able to detect the same scene to be considered in a fast sequence of images. Assuming the required rapidity and precision in the required mechanism of the camera module both possibilities provide comparative results from the perspective of the computing module. Since the movable CCD or CMOS spot more or less merely simulates the static CCD or CMOS array, in the following explanation by way of example merely the CCD or CMOS array is considered. However, it should be noted that there is also the possibility to use a single fixed camera module or to use a movable CCR or CMOS array depending on a respective application.

Figure 2:
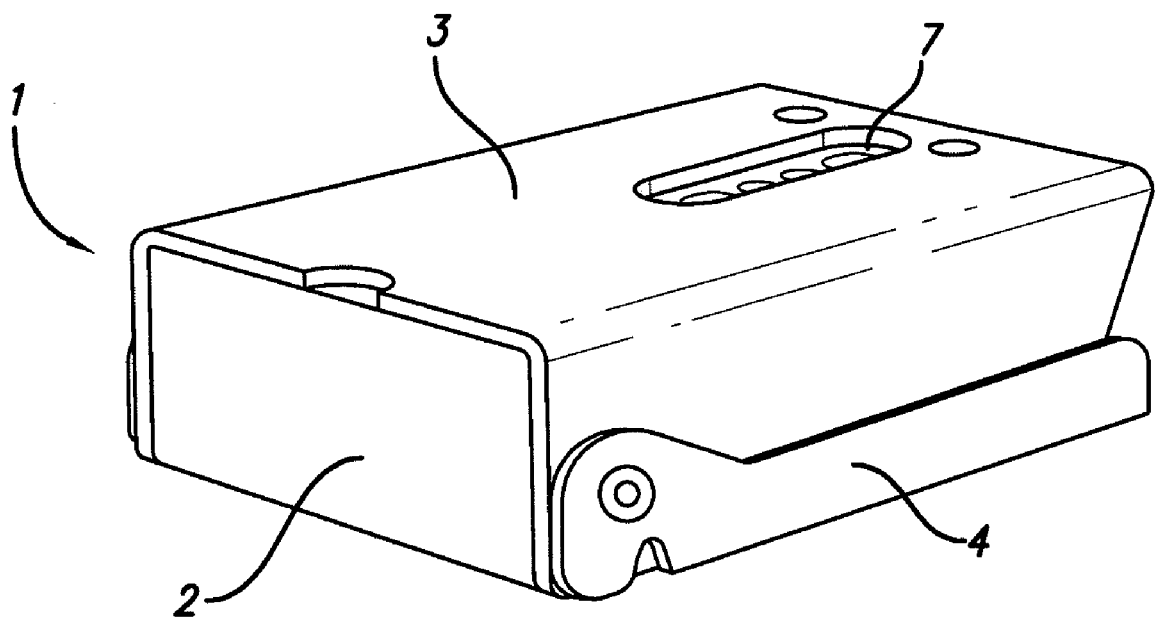
FIG. 2 is a perspective view of the reading device according to the embodiment of the present invention in a non-operating position.
Figure 3:
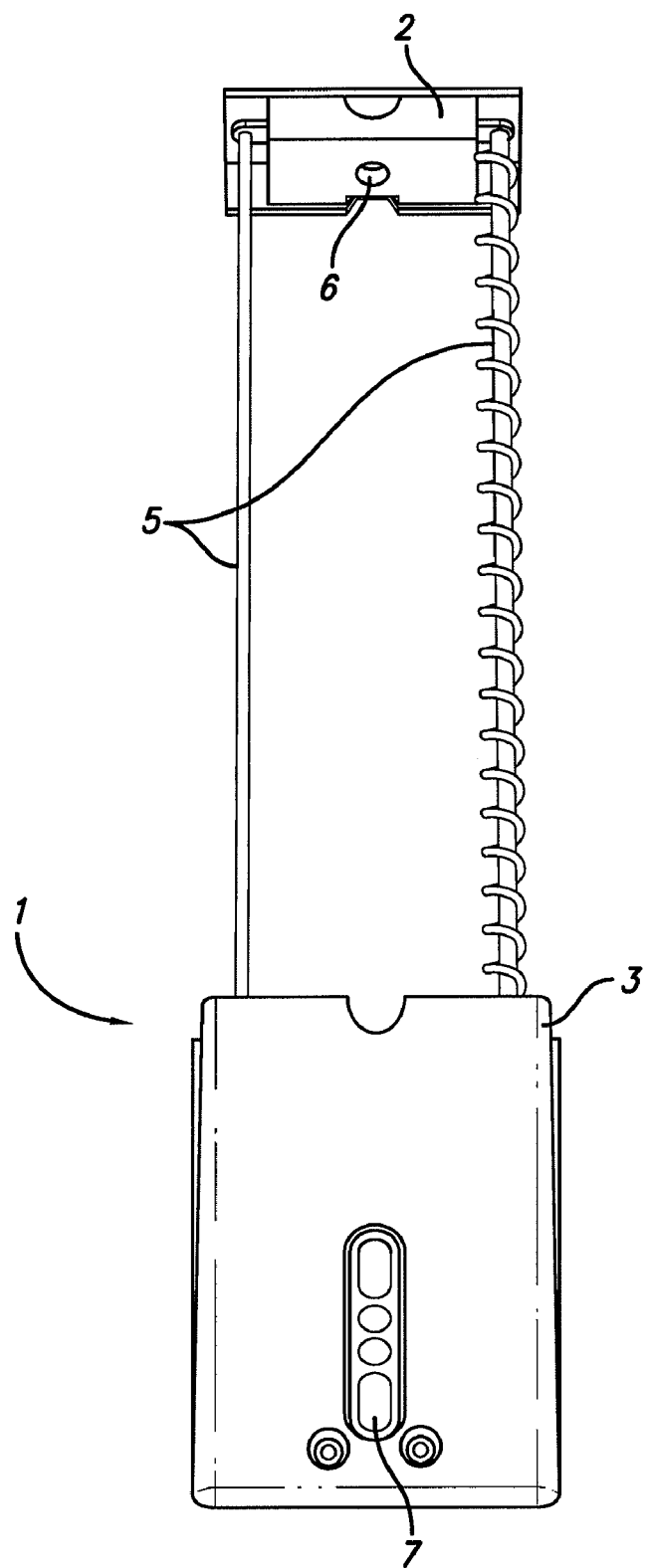
FIG. 3 is a front view of the reading device according to the embodiment of the present invention in an operating position.
Figure 4:
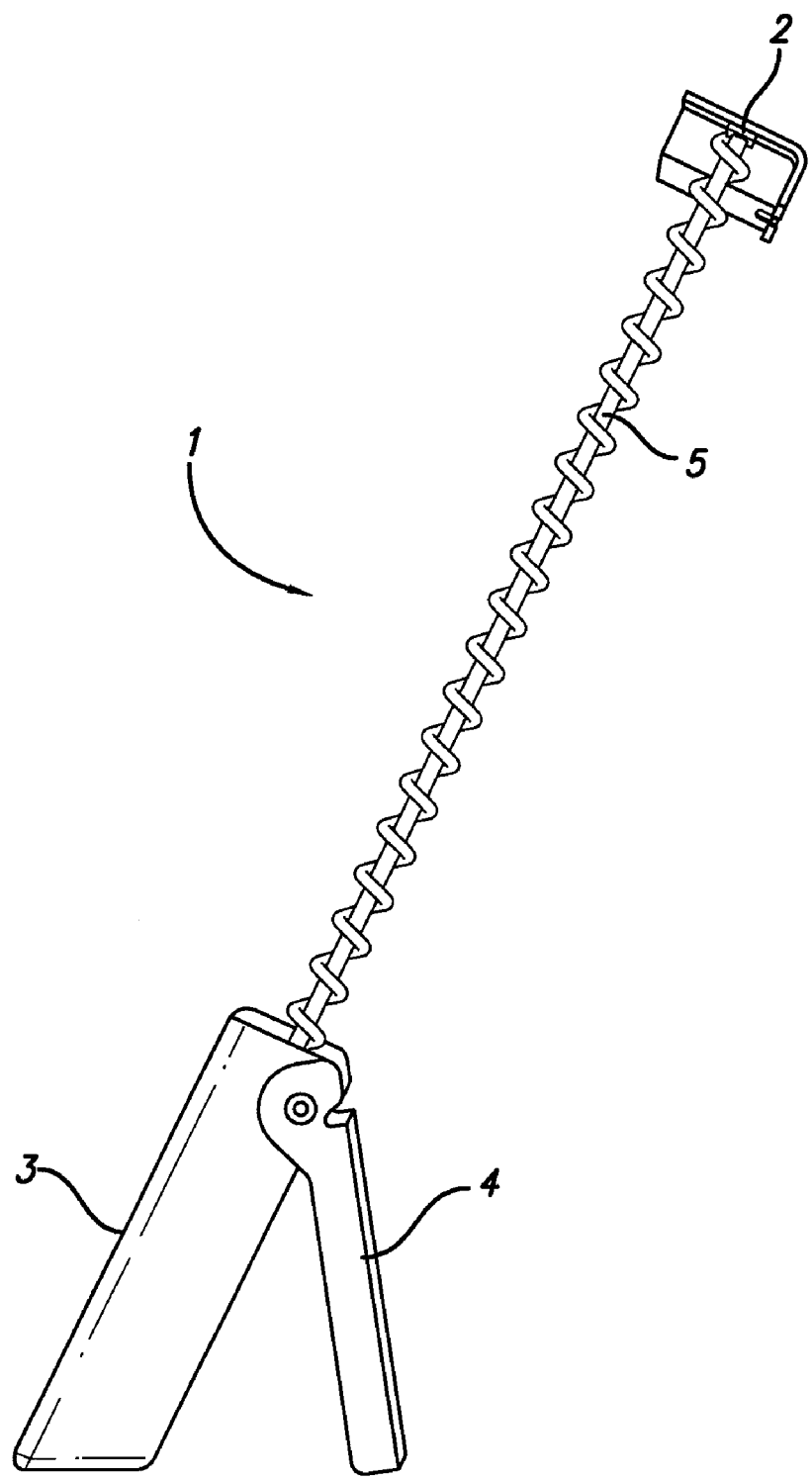
FIG. 4 is a left-side view of the reading device according to the embodiment of the present invention in an operating position.
Figure 5:
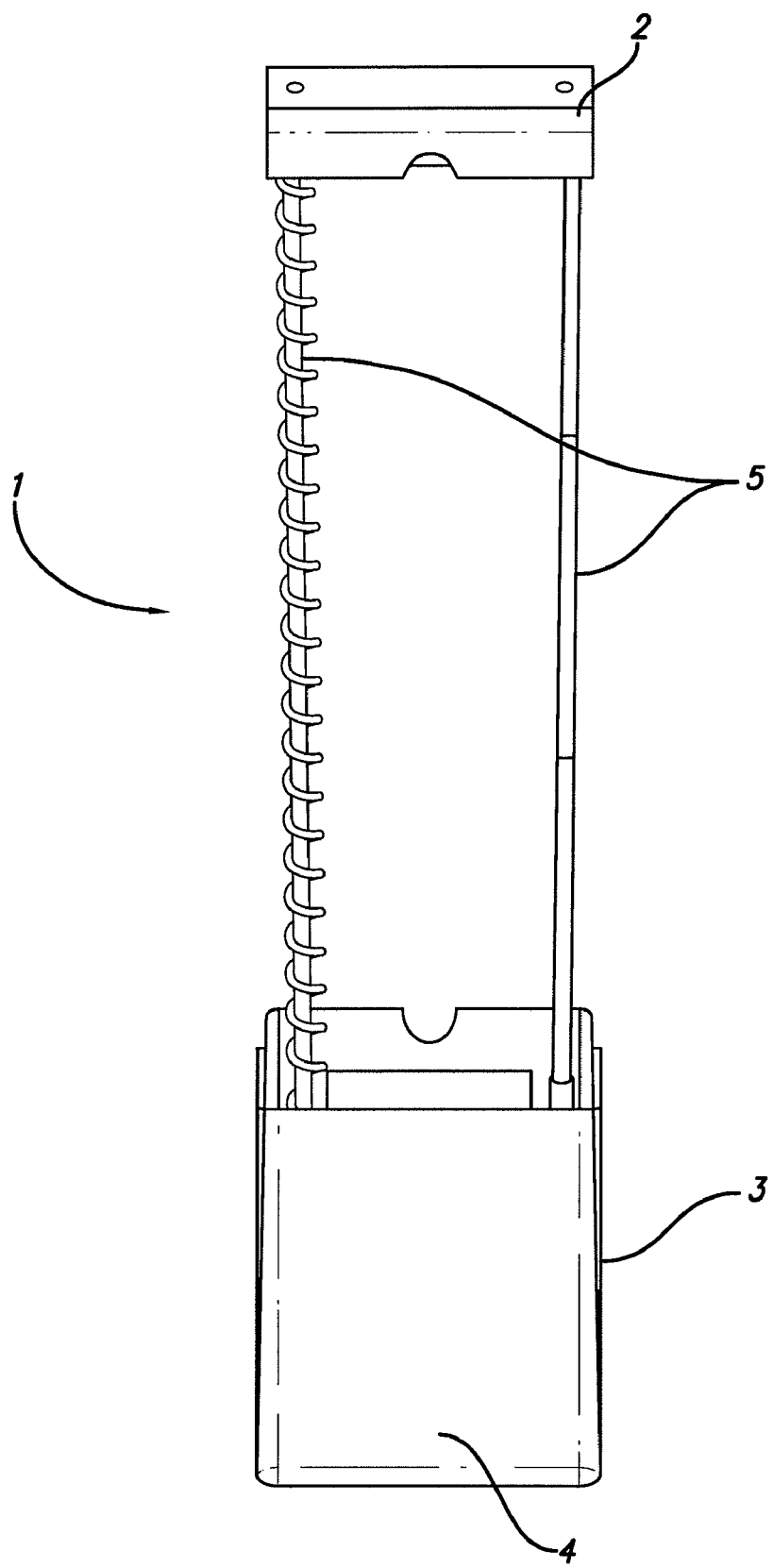
FIG. 5 is a rear view of the reading device according to the embodiment of the present invention in an operating position.
Figure 6:
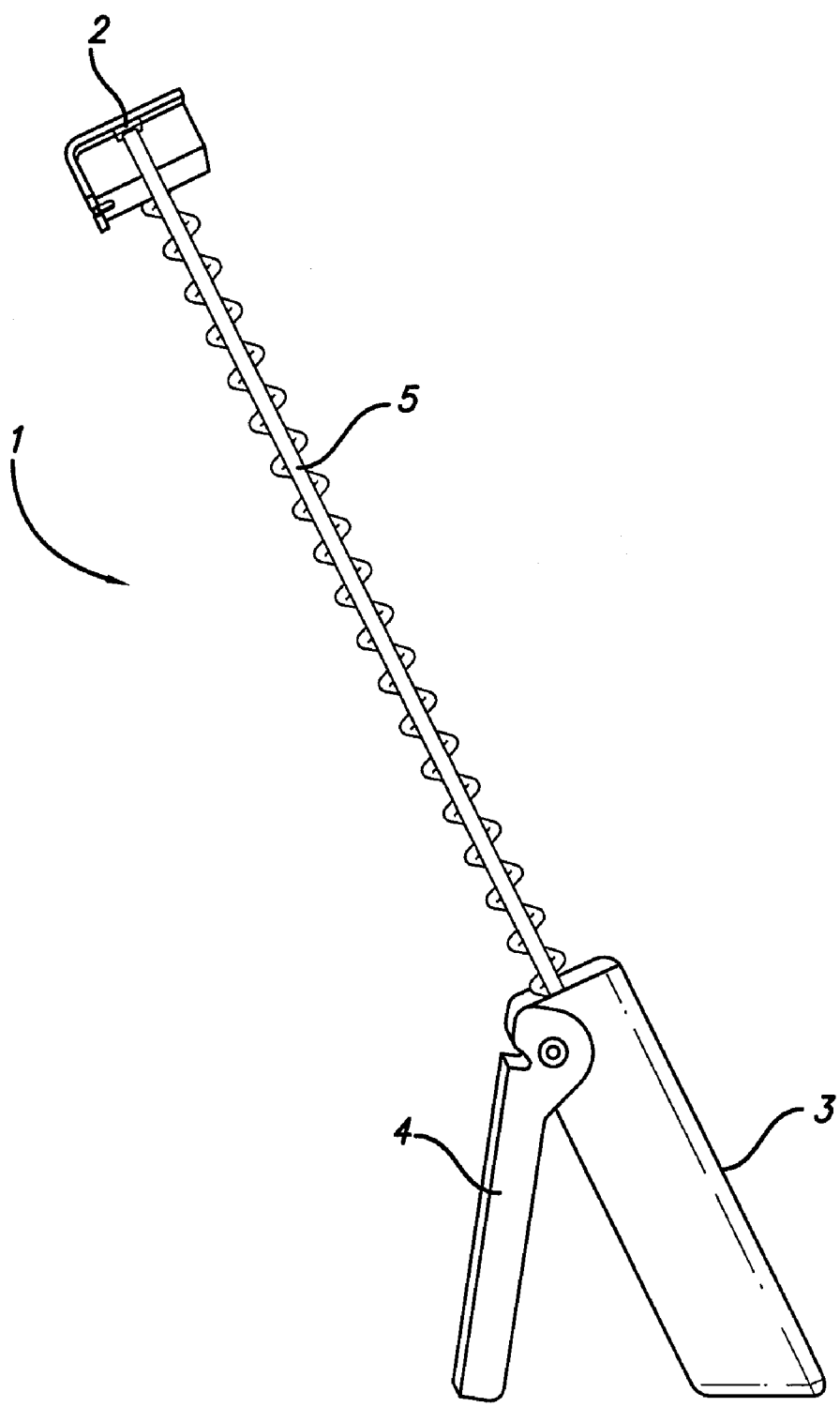
FIG. 6 is a right-side view of the reading device according to the embodiment of the present invention in an operating position.

FIGS. 1 to 14 illustrate a reading device according to an embodiment of the present invention. In more detail, FIG. 1 is a perspective view of a reading device according to the embodiment of the present invention in an operating position, FIG. 2 is a perspective view of the reading device according to the embodiment of the present invention in a non-operating position, FIGS. 3 to 8 are a front view, a left-side view, a rear view, a right-side view, a bottom view and a top view of the reading device according to the embodiment of the present invention in an operating position, respectively and FIGS. 9 to 14 are a left-side view, a right-side view, a bottom view, a top view, a rear view and a front view of the reading device according to the embodiment of the present invention in a non-operating position, respectively.

The reading device 1 comprises a housing having a first part 2, a second part 3 and a third part 4, an adjusting unit 5, an image capturing unit 6, an image processing unit and a text outputting unit.

Figure 7:
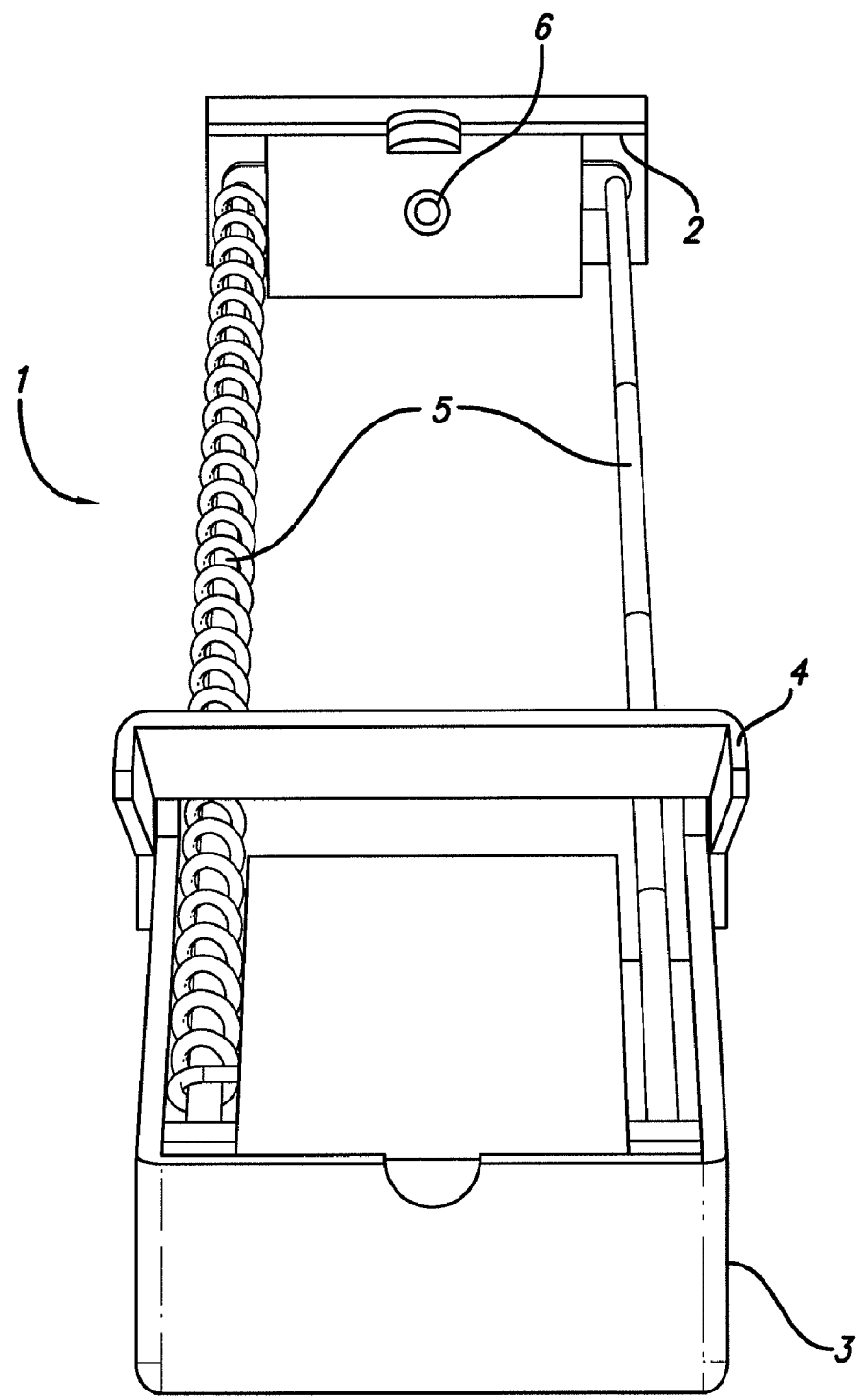
FIG. 7 is a bottom view of the reading device according to the embodiment of the present invention in an operating position.
Figure 8:
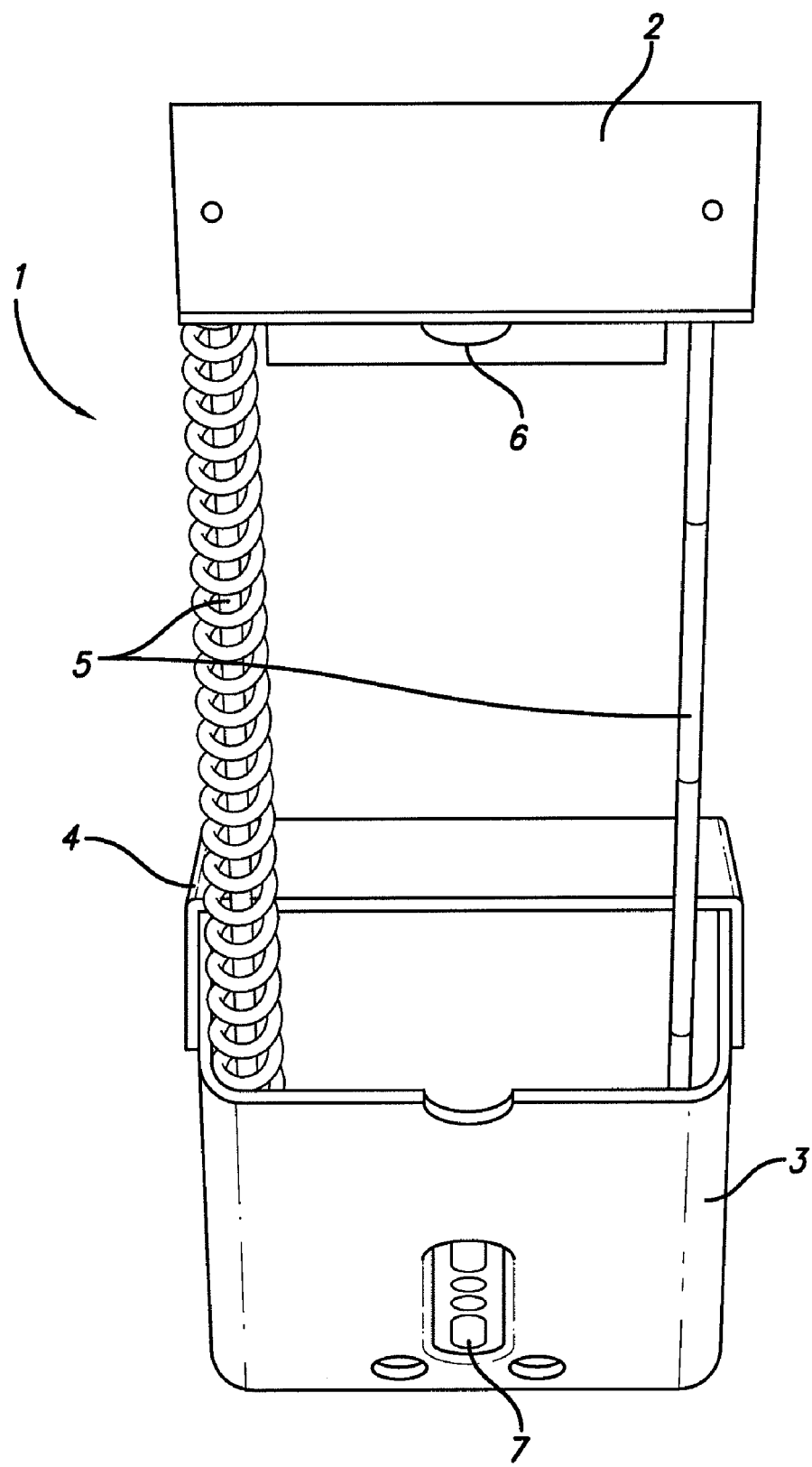
FIG. 8 is a top view of the reading device according to the embodiment of the present invention in an operating position.
Figure 9:
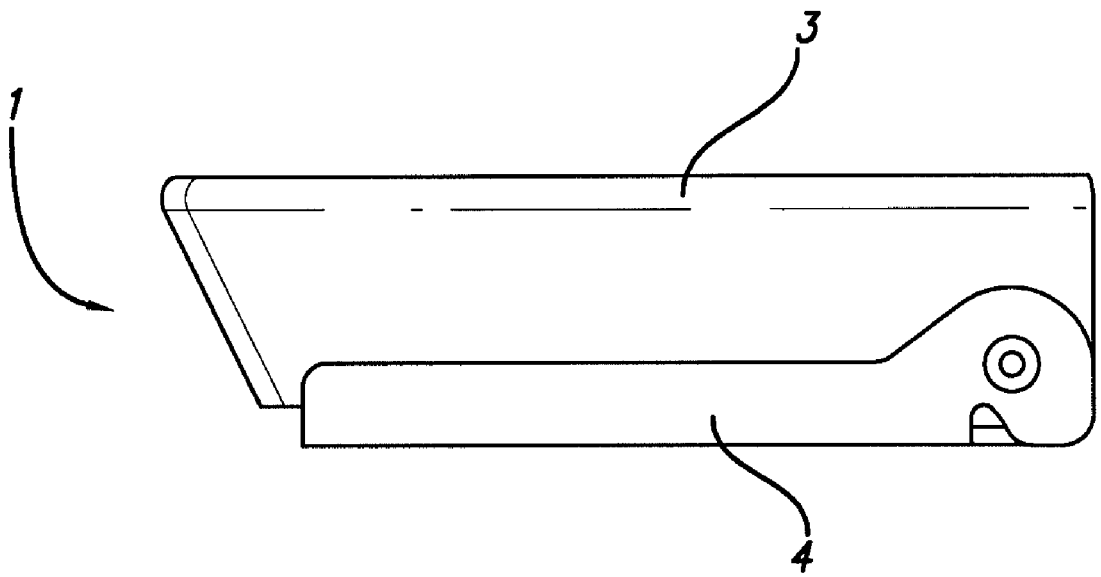
FIG. 9 is a left-side view of the reading device according to the embodiment of the present invention in a non-operating position.
Figure 10:
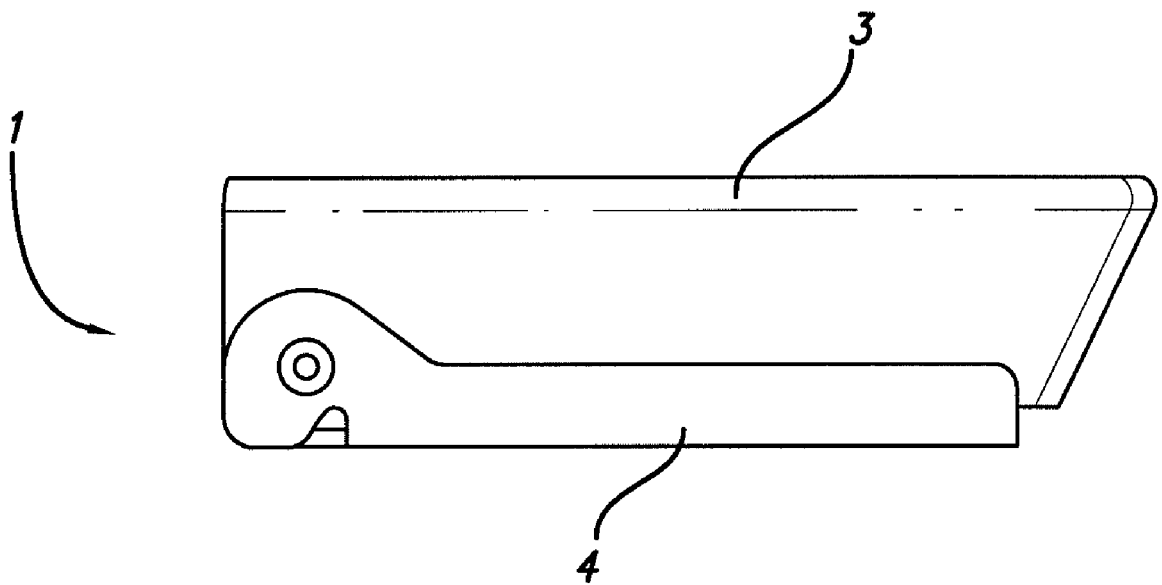
FIG. 10 is a right-side view of the reading device according to the embodiment of the present invention in a non-operating position.
Figure 11:
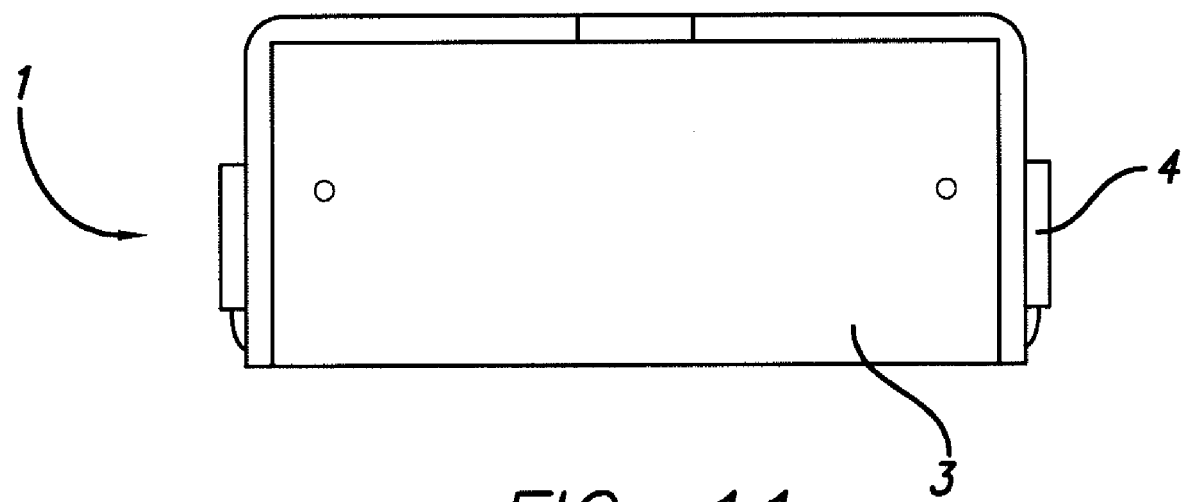
FIG. 11 is a bottom view of the reading device according to the embodiment of the present invention in a non-operating position.
Figure 12:
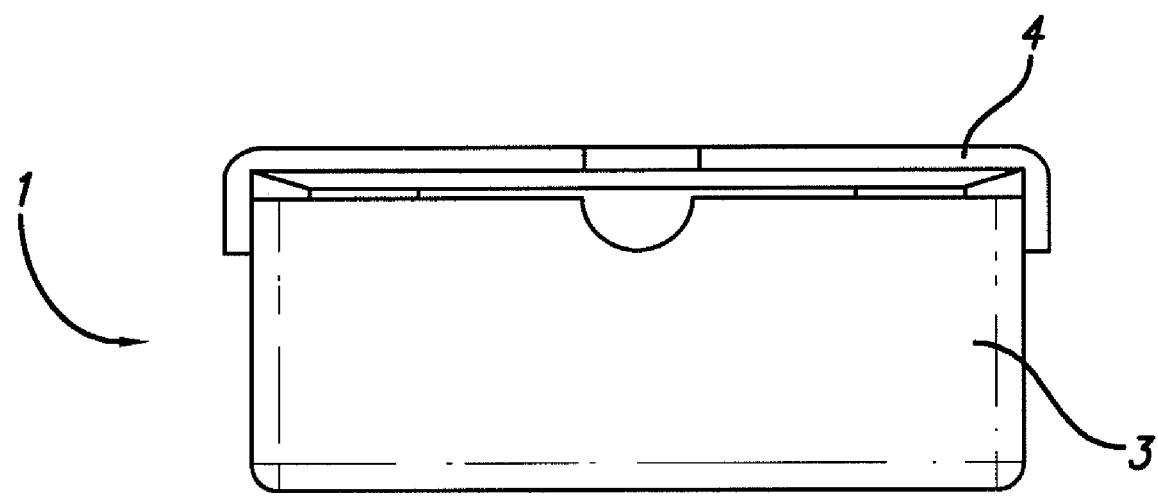
FIG. 12 is a top view of the reading device according to the embodiment of the present invention in a non-operating position.
Figure 13:
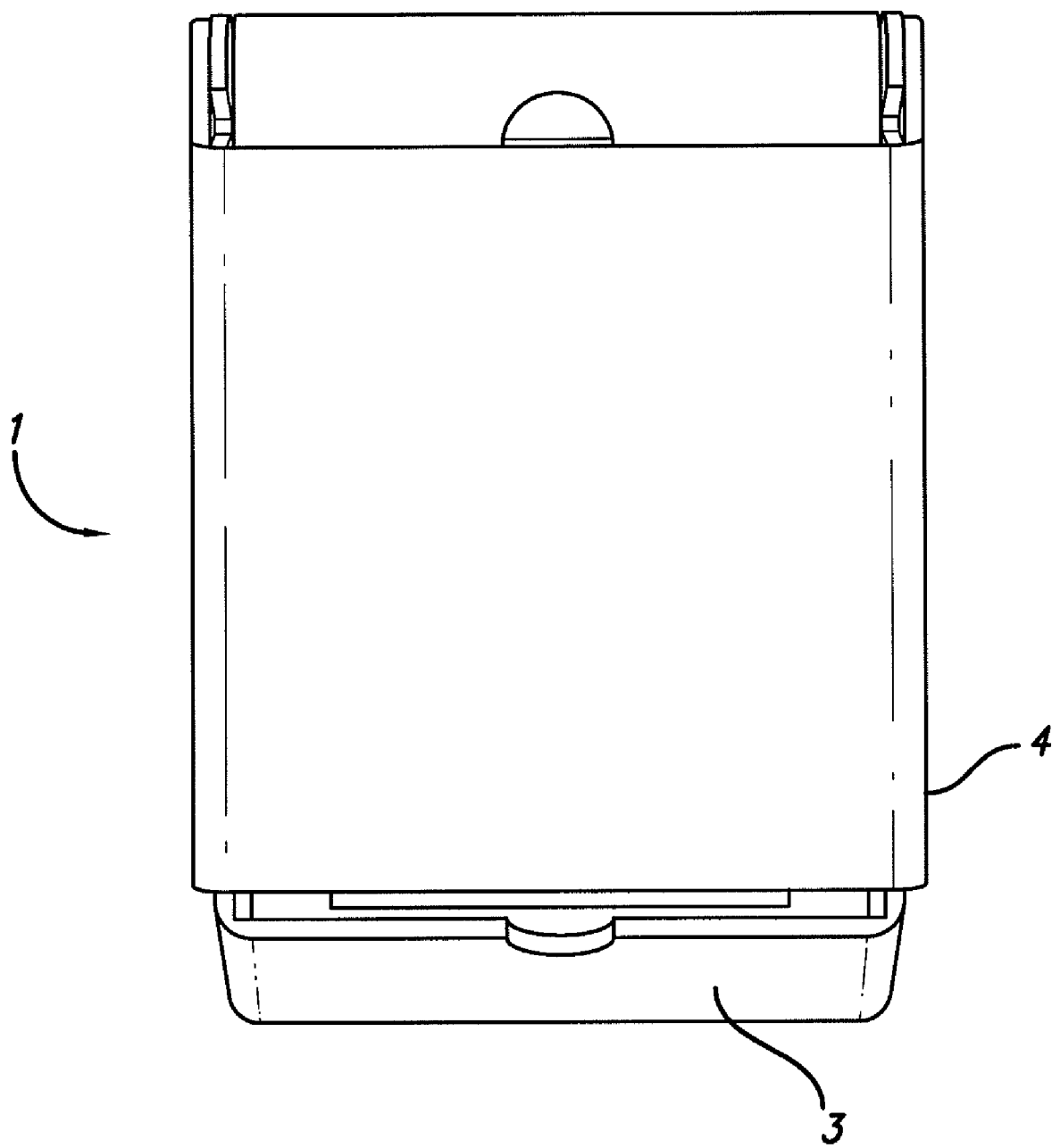
FIG. 13 is a rear view of the reading device according to the embodiment of the present invention in a non-operating position.
Figure 14:
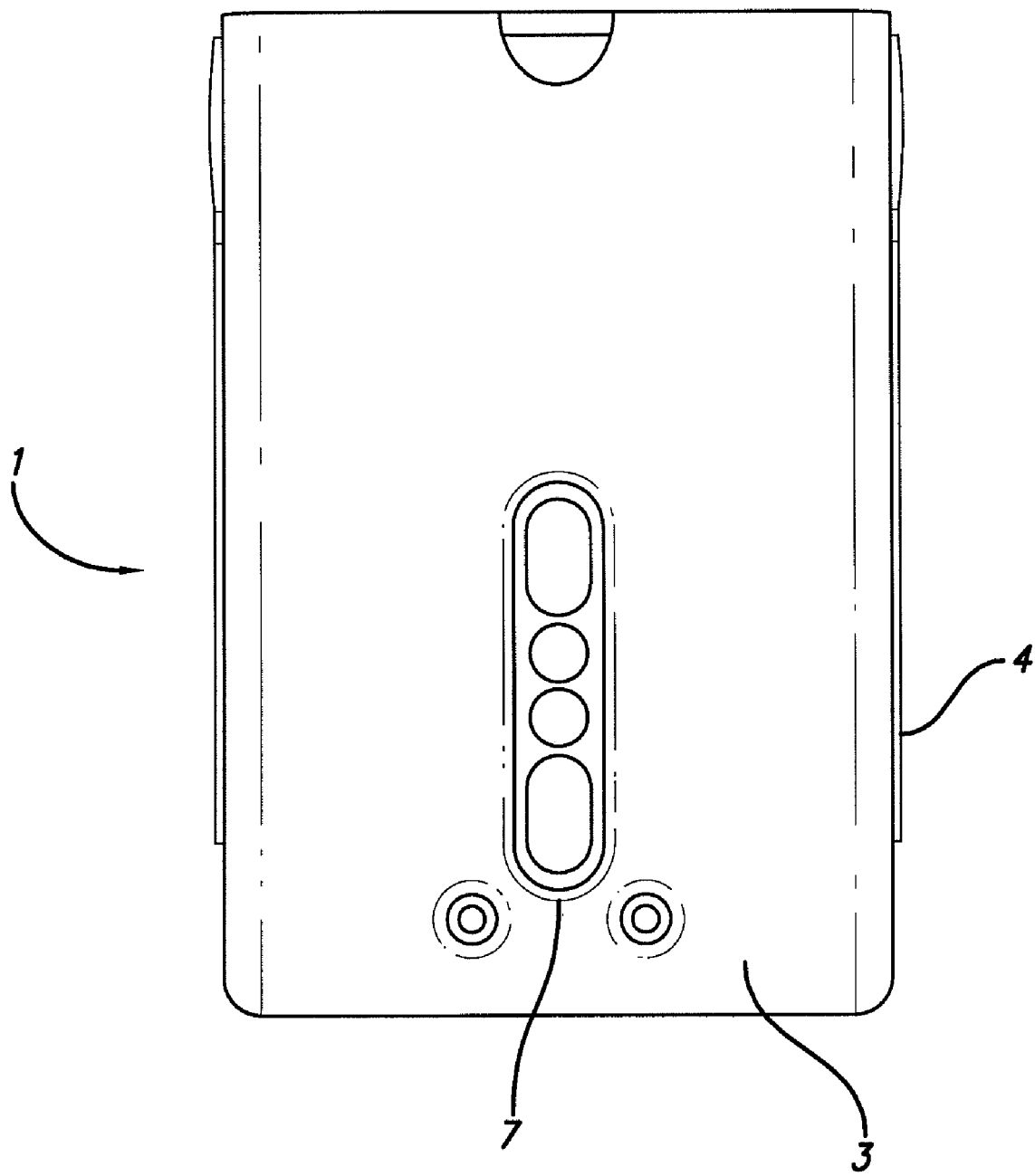
FIG. 14 is a front view of the reading device according to the embodiment of the present invention in a non-operating position.

The image capturing unit is attached to the first part 2 of the housing as shown in FIGS. 7 and 8. The second part 3 of the housing accommodates the image processing unit and the text outputting unit.

The adjusting unit 5 which is a telescopic pull-out in the embodiment of the present invention couples the first part 2 and the second part 3 of the housing with each other. The third part 4 of the housing is rotatably attached to the second part 3 of the housing.

In an operating position of the reading device 1 the first part 2 and the second part 3 of the housing are spaced apart each other and the third part 4 of the housing is spaced apart the second part 3 of the housing and defines a support of the housing. In the embodiment the adjusting unit 5 slidably adjusts a position of the first part 2 of the housing, wherein an amount of slidable adjustment of the position of the first part 2 of the housing having the image capturing unit 6 attached thereto defines a size of a capturing area of the image capturing unit 6 in the operating position. The capturing area of the image capturing unit 6 is an area which is present on a base on which the reading device 1 is present. By slidable adjusting the position of the first part 2 of the housing the distance between the image capturing unit 6 and the base is varied and therefore, the size of the capturing area of the image capturing unit 6 is varied accordingly.

As is obvious from FIGS. 1, 2, 3, 8 and 14 operating switches for operating the reading device 1 are present on the second part 3 of the housing. Furthermore, there is also the possibility to perform control of operation of the reading device 1 by at least one of gesture or speech in addition or instead of control of operation of the reading device 1 by the operating switches 7.

The image capturing unit 6 can be a camera module and especially a CCD or CMOS array comprising a plurality of CDD or CMOS modules. Furthermore, the image capturing unit 6 can be movable. Especially, the image capturing unit 6 can be configured to capture individual pictures of an capturing area of the image capturing unit 6 and to additionally capture video streams of the capturing area of the image capturing unit 6.

As is obvious from FIGS. 1 to 14, the reading device 1 has an operating position in which the capturing area of the image capturing unit 6 can be easily adjusted by adjusting an amount of slidable adjustment of the position of the first part 2 of the housing and has an non-operating position in which the image capturing unit 6, the image processing unit and the text outputting unit are accommodated in the housing whilst being surrounded from the first part 2, the second part 3 and the third part 4 of the housing.

Therefore, the reading device 1 can easily carried by a blind or visually impaired person whilst components thereof being protected against damage by the housing of the reading device 1.

The general functional principle of the reading device 1 will be described hereinafter.

The image capturing unit 6 captures an image of an environment of the blind or visually impaired person and outputs image data corresponding thereto. Since the reading device 1 is a portable reading device which is configured to be a tabletop unit the environment is an area of the base where the reading device 1 is present. If, for example, a sheet of paper having text thereon is positioned on the base in the capturing area of the reading device 1 the image capturing unit 6 captures an image of the sheet of paper having text thereon and outputs corresponding image data. The image processing unit processes the image data outputted by the image capturing unit 6 such that the text present on the sheet of paper is recognized and extracted from the image data. Text data corresponding to the recognized and extracted text is outputted by the image processing unit. The text outputting unit outputs data corresponding to the text data outputted by the image processing unit in a form noticeable by the blind or visually impaired person, for example in form of speech, or in a form convertable to be noticecable by the blind or visually impaired person. In the latter case the data can be inputted in a further unit which is, for example, external to the reading device 1 and converted by the further unit, for example a computer, to the form noticeable by the blind or visually impaired person.

The detailed functional principle of the reading device 1 will be described later in more detail.

Figure 15:
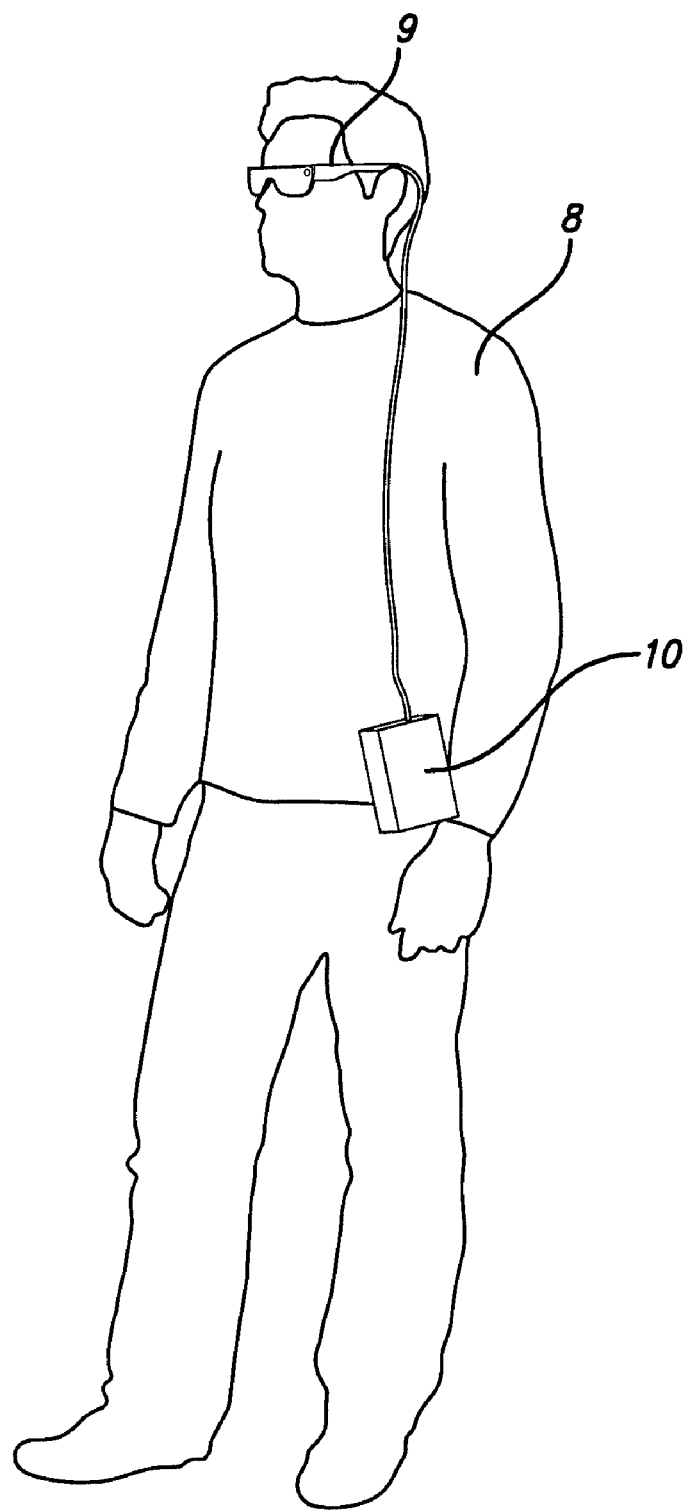
FIG. 15 is a schematic view of a reading device according to a further embodiment of the present invention.

FIG. 15 illustrates a reading device according to a further embodiment of the present invention.

As shown in FIG. 15 the reading device comprises a carrying unit to be carried on a body of a blind or visually impaired person 8. The carrying unit comprises a first part 9 having a image capturing unit attached thereto and a second part 10 accommodating a image processing unit and a text outputting unit.

The image capturing unit 6 captures an image of an environment of the blind or visually impaired person and outputs image data corresponding thereto. The image processing unit processes the image data outputted by the image capturing unit such that text data is recognized and extracted from the image data and outputs text data corresponding thereto. Since the reading device is a portable reading device which is configured to comprise a component in the form of eye glasses the environment is an area in front of the blind or visually impaired person carrying the portable reading device. If, for example, a road sign having text thereon is positioned on front of the blind or visually impaired person carrying the portable reading device, the image capturing unit captures an image of the road sign having text thereon and outputs corresponding image data. The image processing unit processes the image data outputted by the image capturing unit 6 such that the text present on the road sign is recognized and extracted from the image data. Text data corresponding to the recognized and extracted text is outputted by the image processing unit. The text outputting unit outputs data corresponding to the text data outputted by the image processing unit in a form noticable by the blind or visually impaired person, for example in form of speech, or in a form convertable to be noticeable by the blind or visually impaired person. In the latter case the data can be inputted in a further unit which is, for example, external to the reading device and converted by the further unit, for example a computer, to the form noticeable by the blind or visually impaired person.

Figure 16:
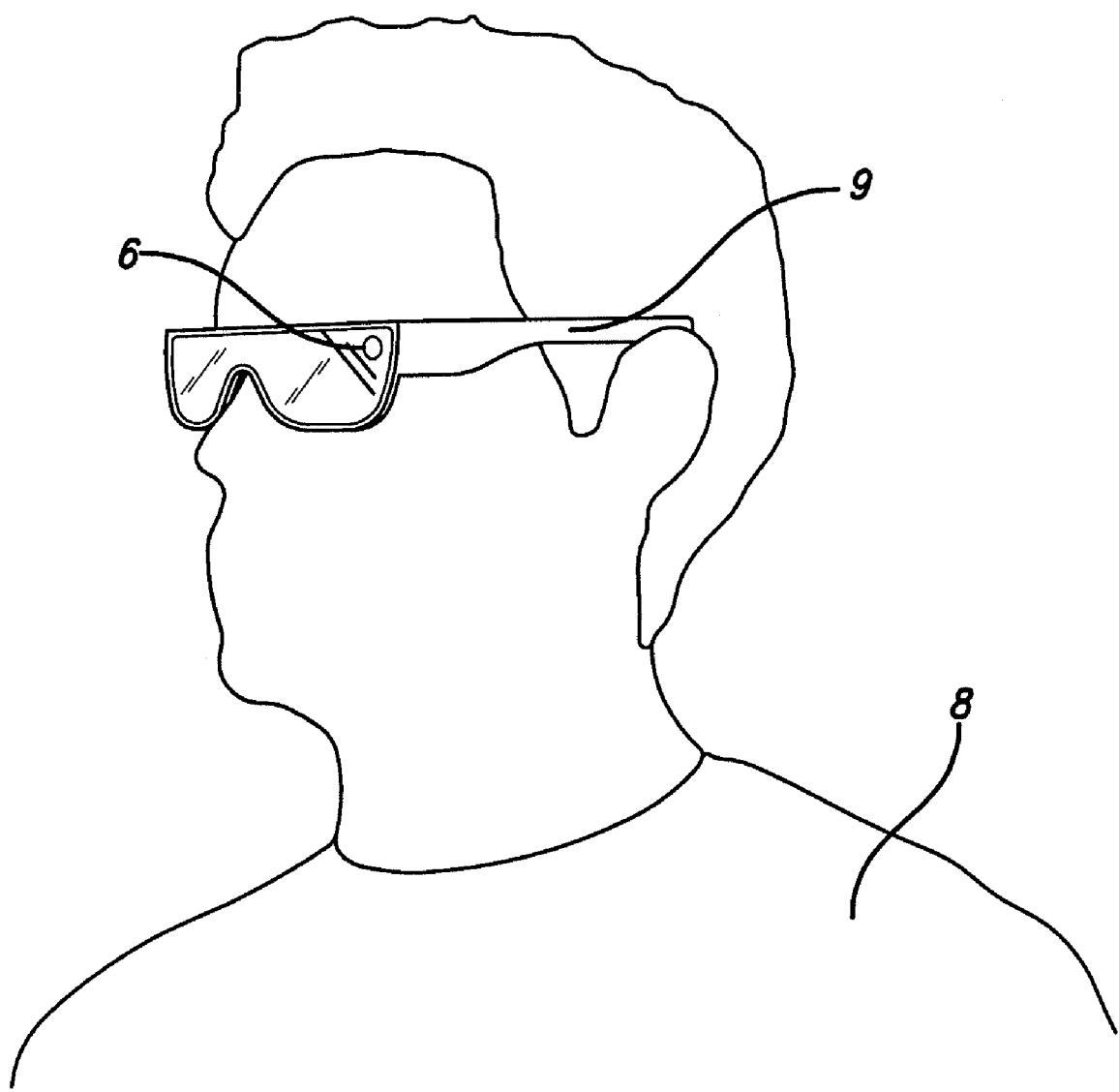
FIG. 16 is a schematic view of a modification of the reading device according to the further embodiment of the present invention.
Figure 17:
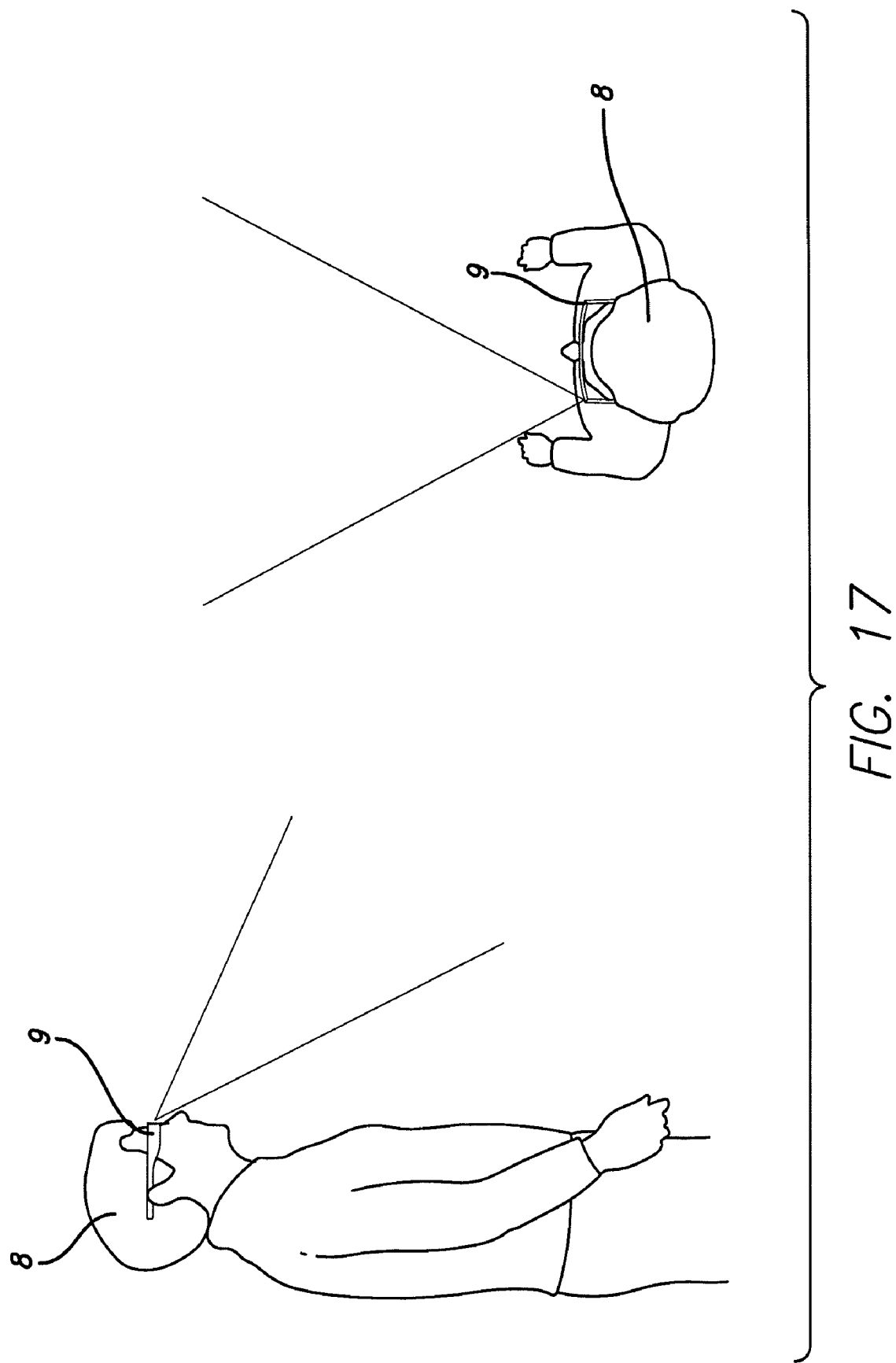
FIG. 17 is a schematic view of the modification of the reading device according to the further embodiment of the present invention.

As is shown in FIGS. 16 and 17 the image capturing unit 6 can be a camera module comprising a single CCD or CMOS module or comprising a single CCD or CMOS array. In the case of FIGS. 16 and 17 the camera module has a fixed predetermined line of sight relative to the first part 9 of the carrying unit.

Figure 18:
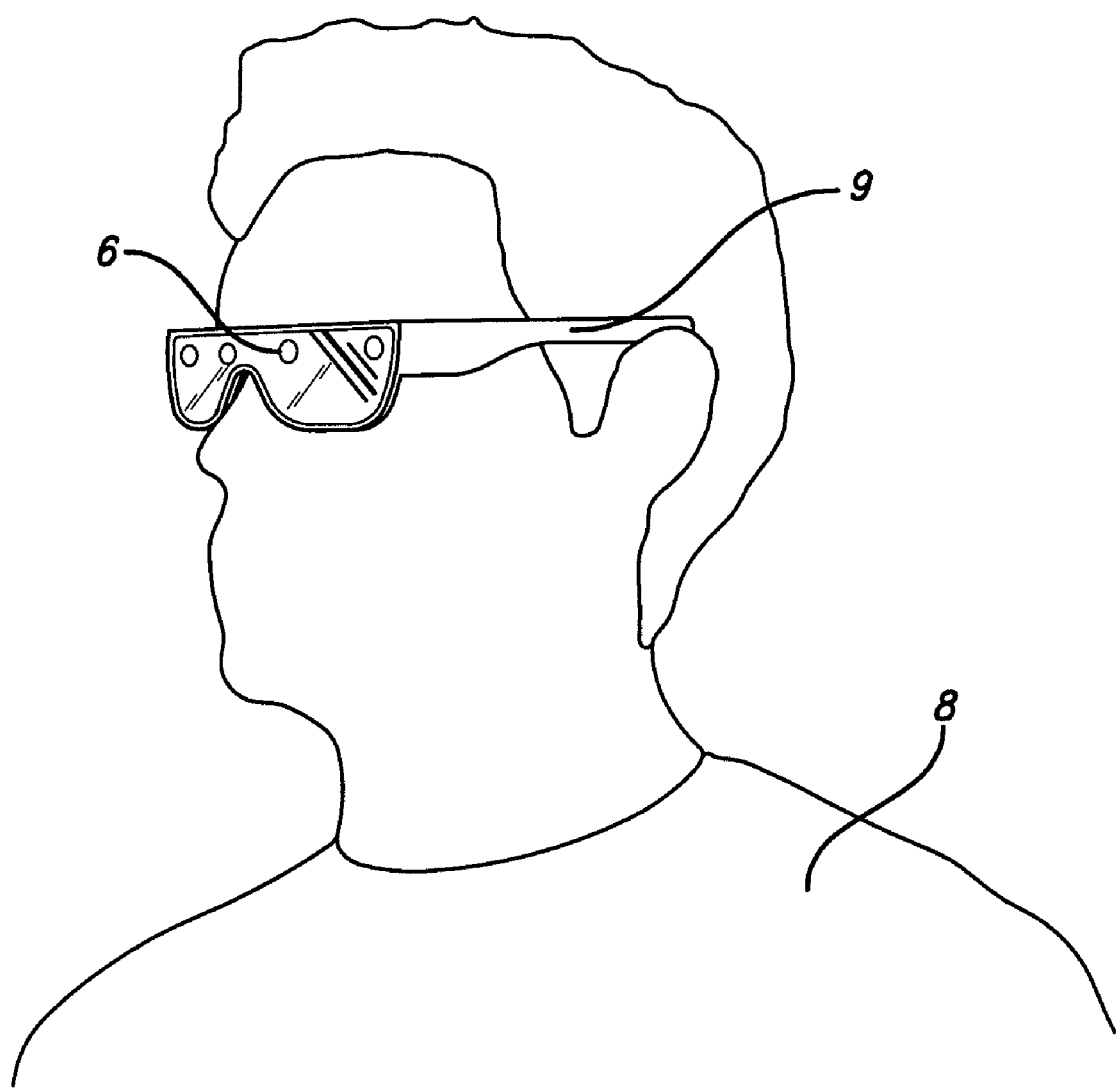
FIG. 18 is a schematic view of a further modification of the reading device according to the further embodiment of the present invention.
Figure 19:
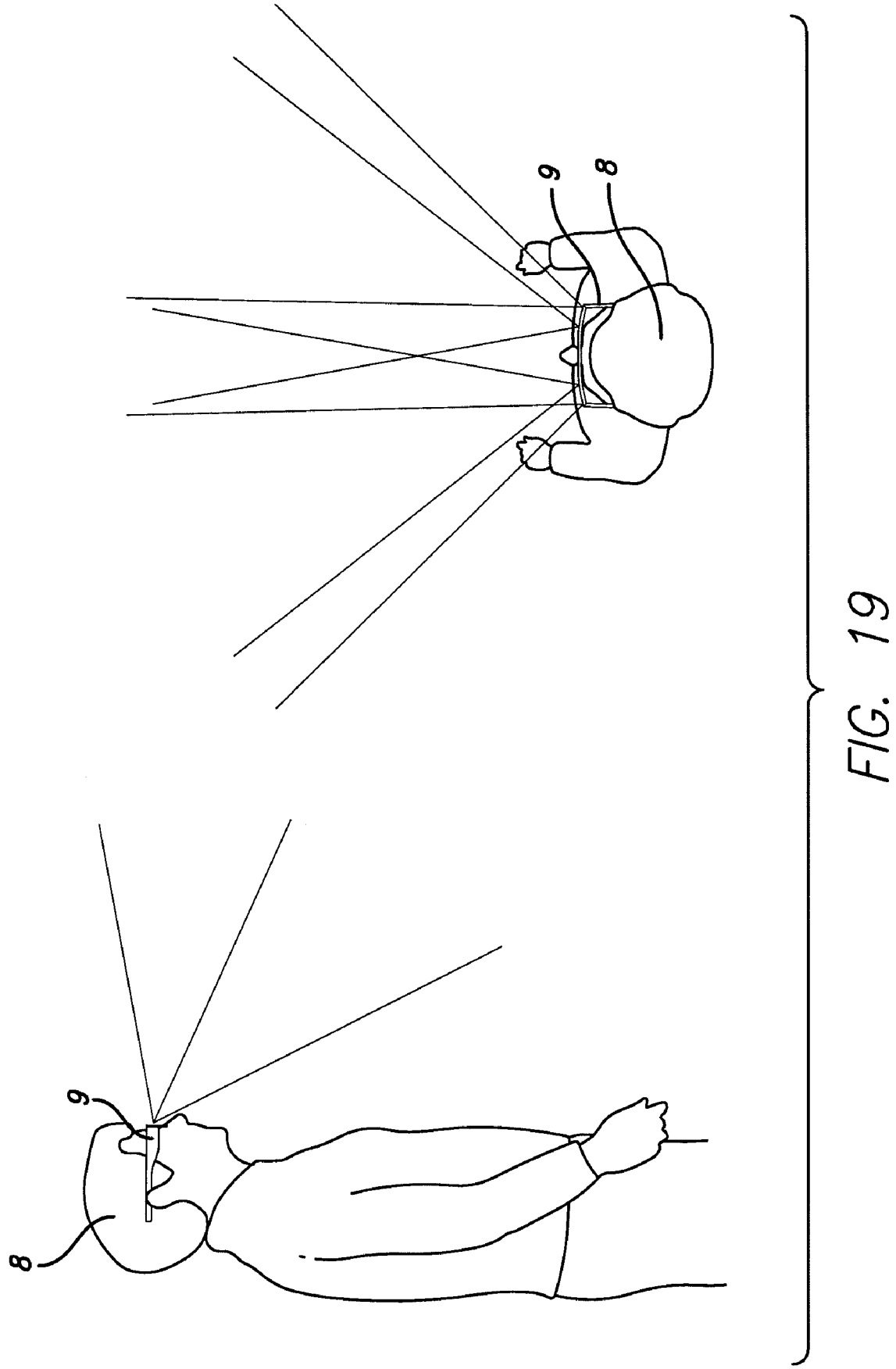
FIG. 19 is a schematic view of the further modification of the reading device according to the further embodiment of the present invention.

As shown in FIGS. 18 and 19 the image capturing unit 6 can be a camera module comprising a plurality of CCD or CMOS modules or comprising a plurality of CCD or CMOS arrays. In the case of FIGS. 18 and 19 the camera module has a variable line of sight relative to the first part 9 of the carrying unit which is controlled by control of operation of the plurality of CCD or CMOS modules or the plurality of CCD or CMOS arrays.

Figure 20:
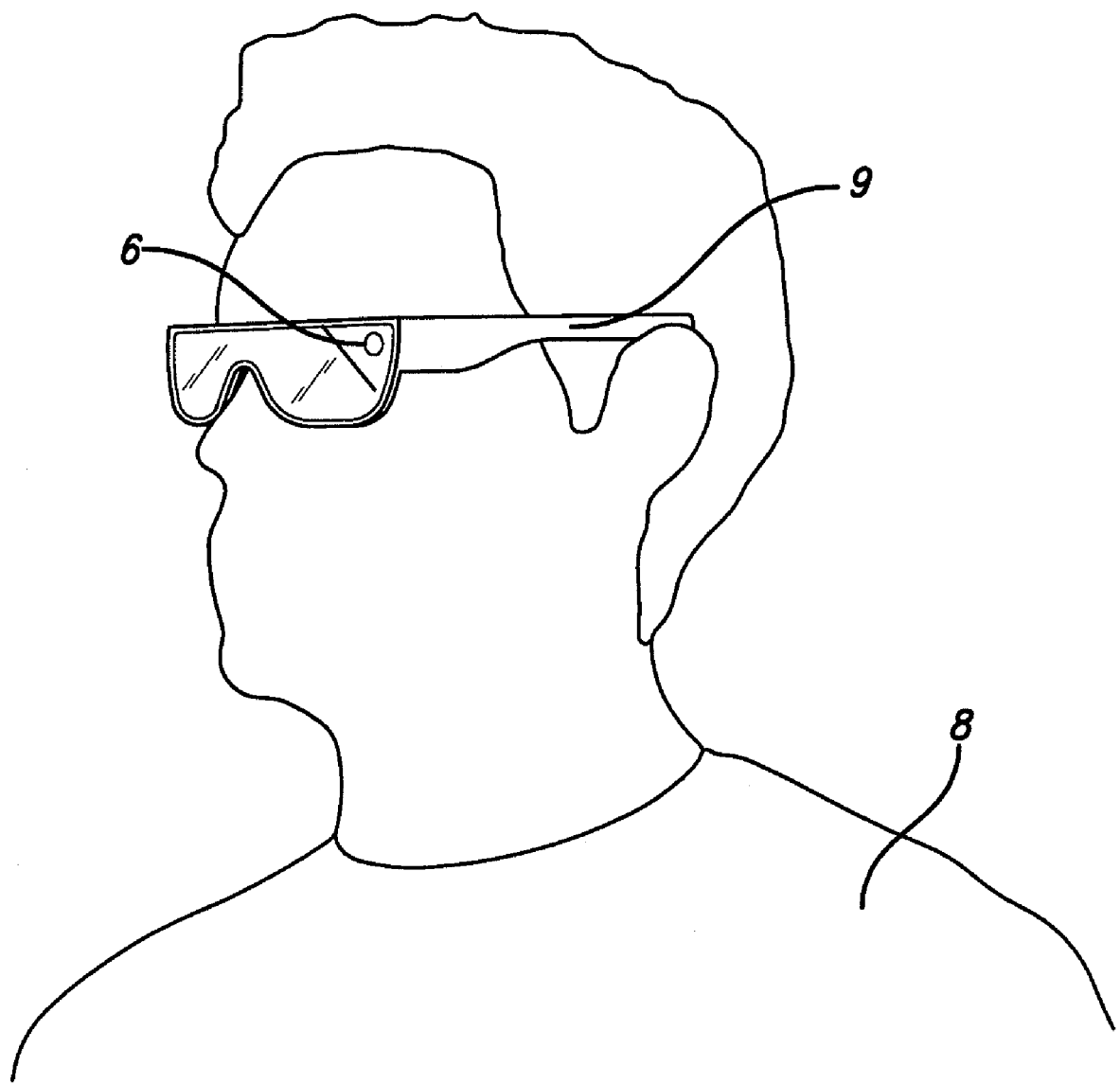
FIG. 20 is a schematic view of a still further modification of the reading device according to the further embodiment of the present invention.
Figure 21:
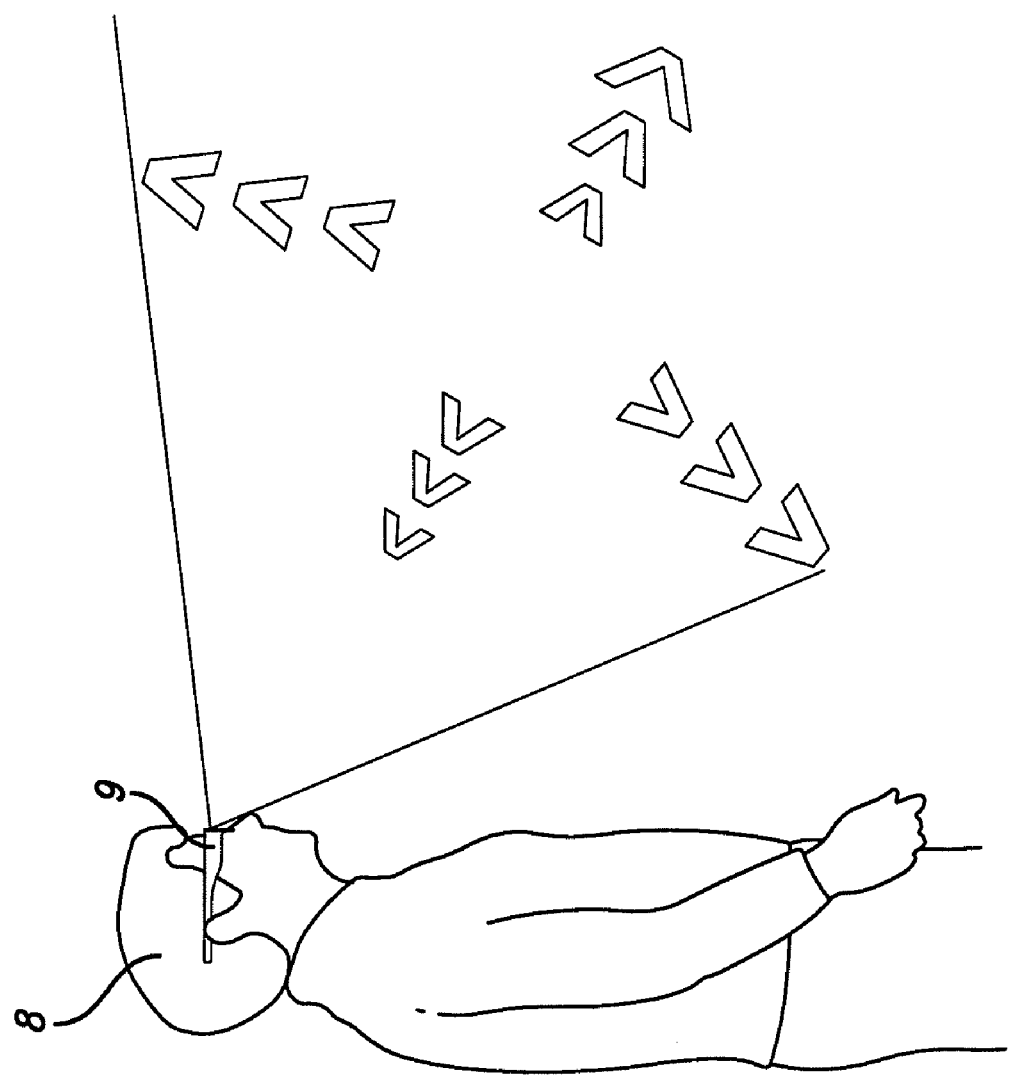
FIG. 21 is a schematic view of the still further modification of the reading device according to the further embodiment of the present invention.

As is shown in FIGS. 20 and 21 the image capturing unit 6 can be a camera module comprising a single CCD or CMOS module or comprising a single CCD or CMOS array. In the case of FIGS. 20 and 21 the camera module has a variable line of sight relative to the first part 9 which is controlled by control of movement of the single CCD or CMOS module or the single CCD or CMOS array relative to the first part 9 of the carrying unit.

In addition, the modifications of FIGS. 18 and 19 and FIGS. 20 and 21 can be combined such that the camera module has a variable line of sight relative to the first part 9 of the carrying unit which is controlled by control of operation of a plurality of CCD or CMOS modules or a plurality of CCD or CMOS arrays and is additionally controlled by control of movement of the plurality of CCD or CMOS modules or the plurality of CCD or CMOS arrays relative the first part 9 of the carrying unit.

Furthermore, it should be noted that control of operation of CCD or CMOS modules or CCD or CMOS arrays as mentioned above can be performed using a predetermined scheme, for example sequentially, or may be performed in an arbitrary manner, for example a zig-zag shape or a sequencing manner. In addition, control of operation of CCD or CMOS modules or CCD or CMOS arrays as mentioned above can be performed in such a manner that a resultant field of view is focused on relevant objects to be detected in a stationary or time-varying manner.

Hereinafter, the functional principle of the reading devices of the embodiments of the present invention and the modifications thereof will be described in detail.

In the following description it is assumed that recognized and processed objects are text objects. However, the reading devices described herein are also suitable for processing other types of objects such as road signs. In this case, in the processing of text objects described hereinafter a specific heuristic tracking logic and a specific recognition software for each type of objects has to be integrated additionally or alternatively.

Shortly, the software used in the computing module which comprises the image processing unit and the text outputting unit captures a arbitrary scene using the camera module comprising the image capturing unit in a timely or otherwise triggered manner, to indentify or recognize potential text objects present in the arbitrary scene and to provide such potential text objects on the basis of a technical complex pre-processing for an OCR and speech synthesis function in an optimal manner. The provision of such potential text objects of the captured arbitrary scene is performed by a specific tracking system which is dynamic, adaptive and self-optimizing.

Therefore, pre-processing comprises the steps of tracking potential text objects and recognizing text objects. It should be noted that OCR and speech synthesis processing subsequent to tracking and recognizing is performed using known methods and, thus, details thereof are omitted here.

Figure 22:
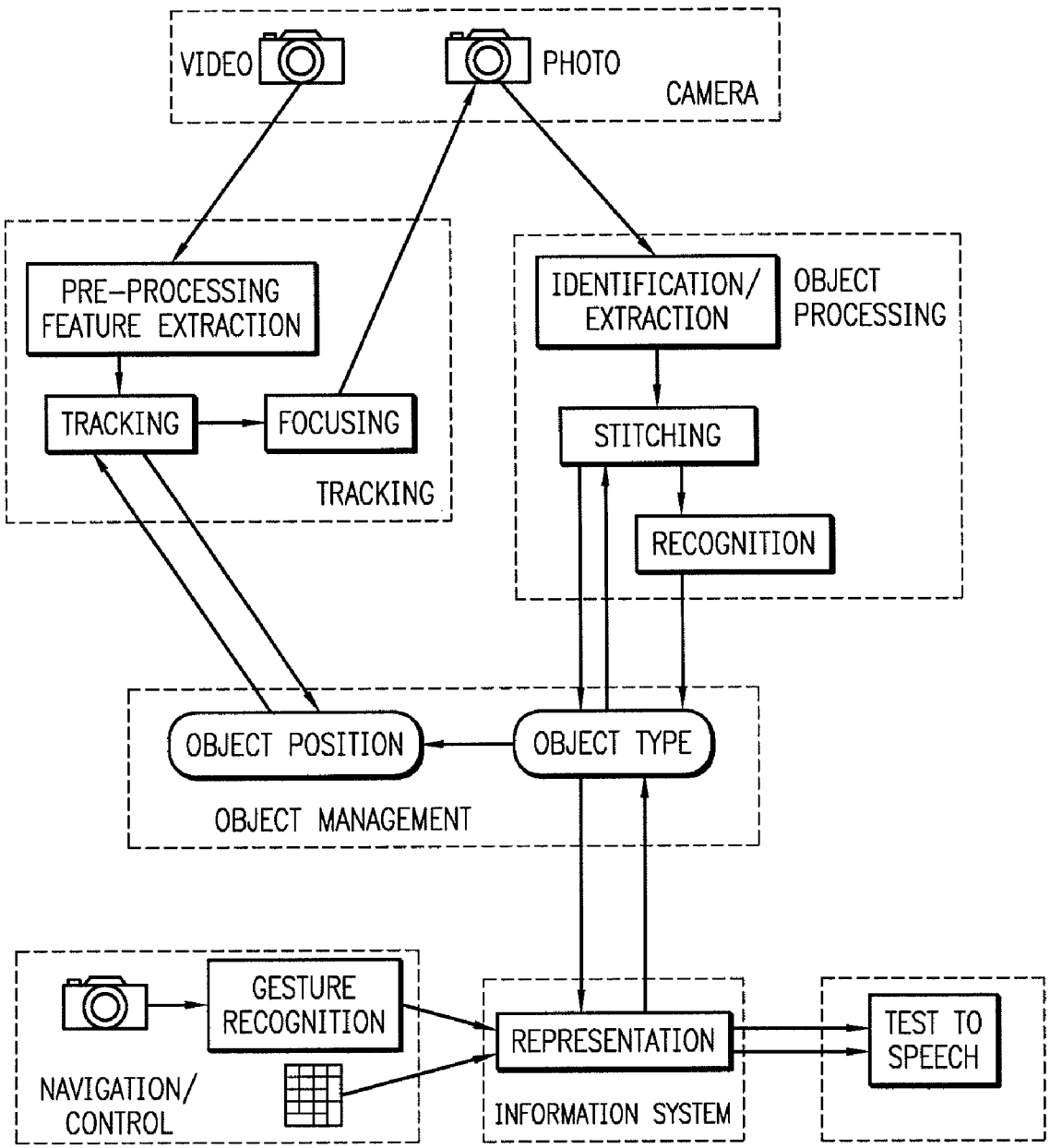
FIG. 22 is a schematic diagram of a functional principle of the reading device according to the embodiments of the present invention and the modifications thereof.
Figure 23:
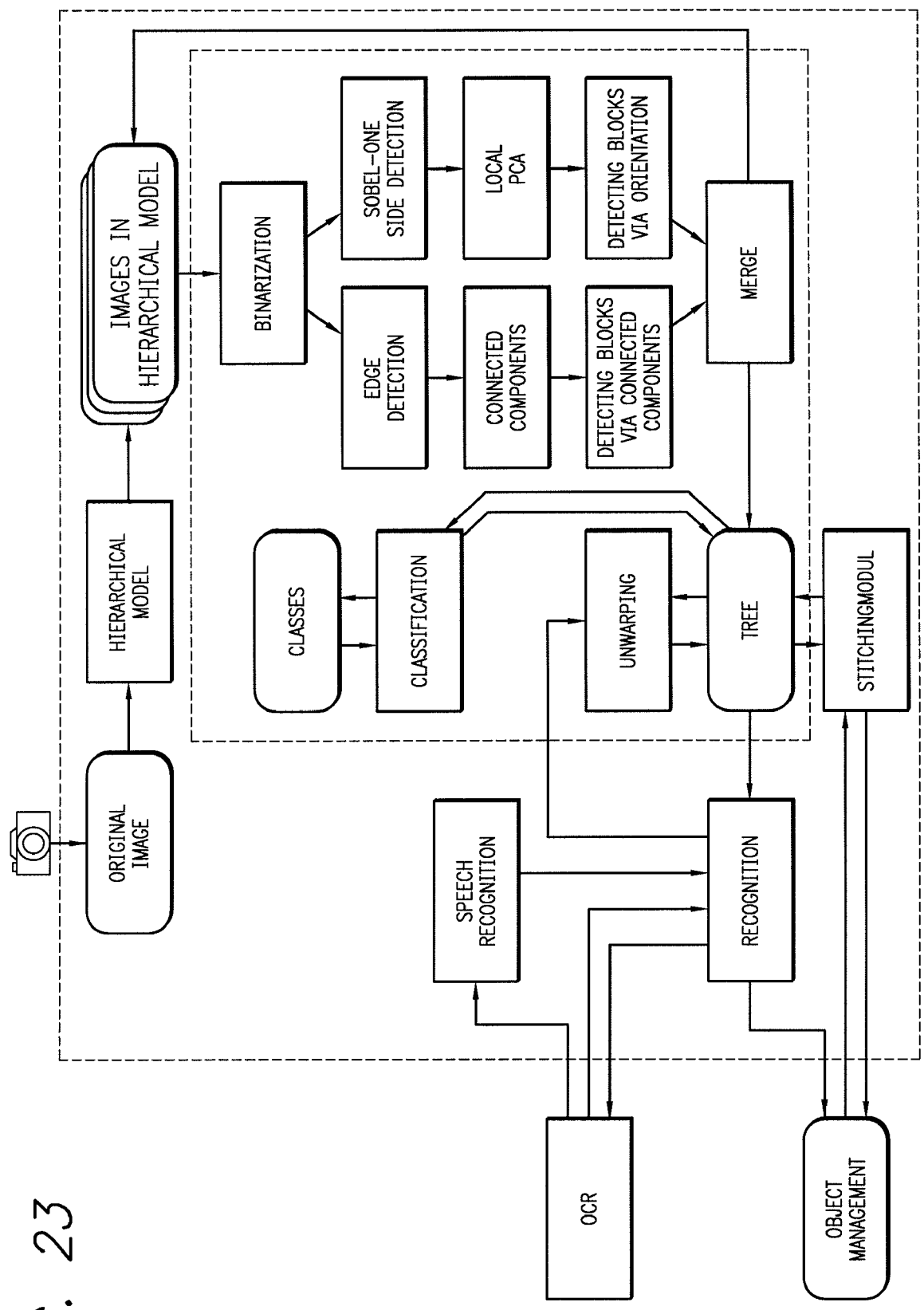
FIG. 23 is a schematic diagram of a further functional principle of the reading device according to the embodiments of the present invention and the modifications thereof.
Figure 24:
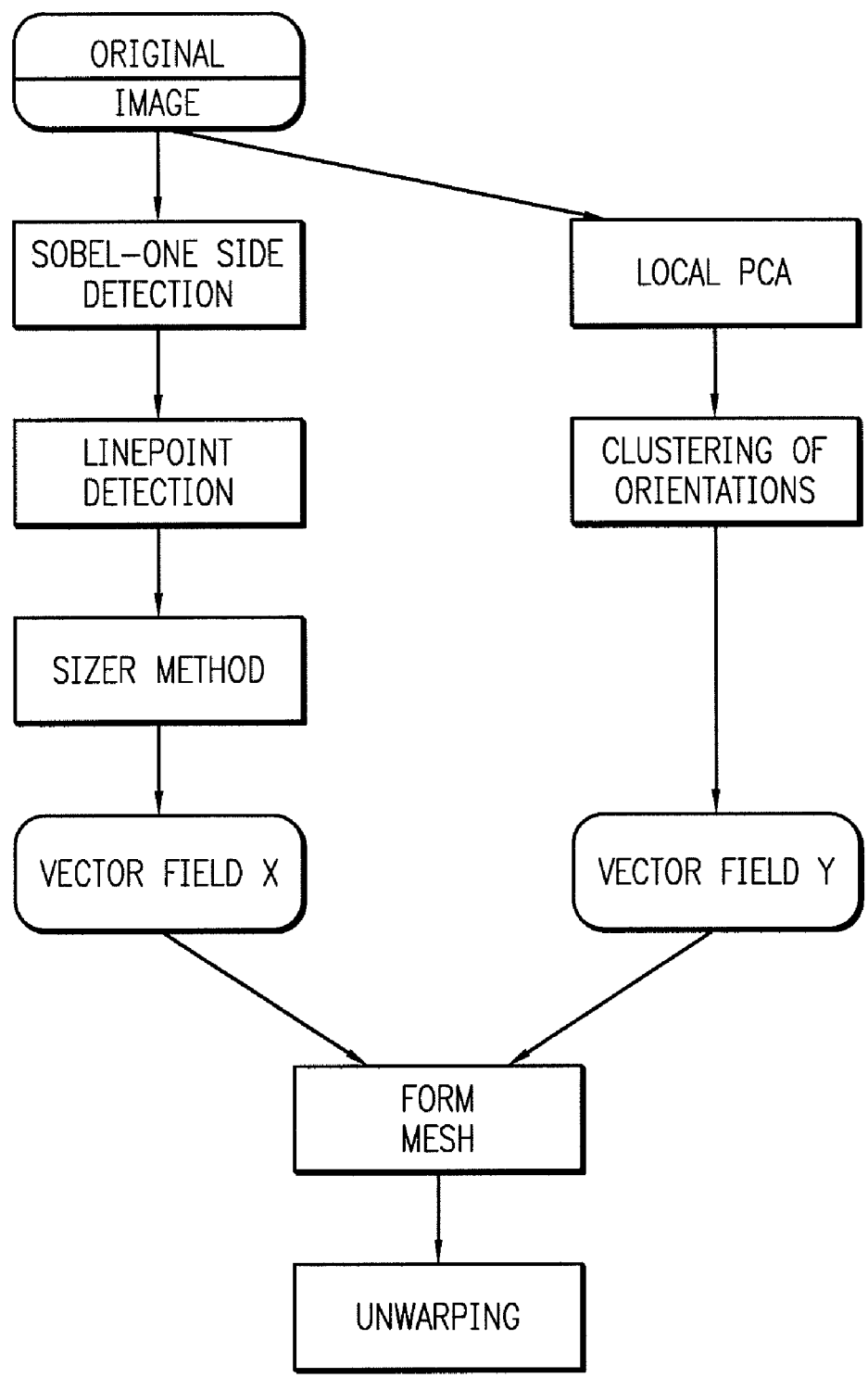
FIG. 24 is a schematic diagram of a still further functional principle of the reading device according to the embodiments of the present invention and the modifications thereof.
Figure 25:
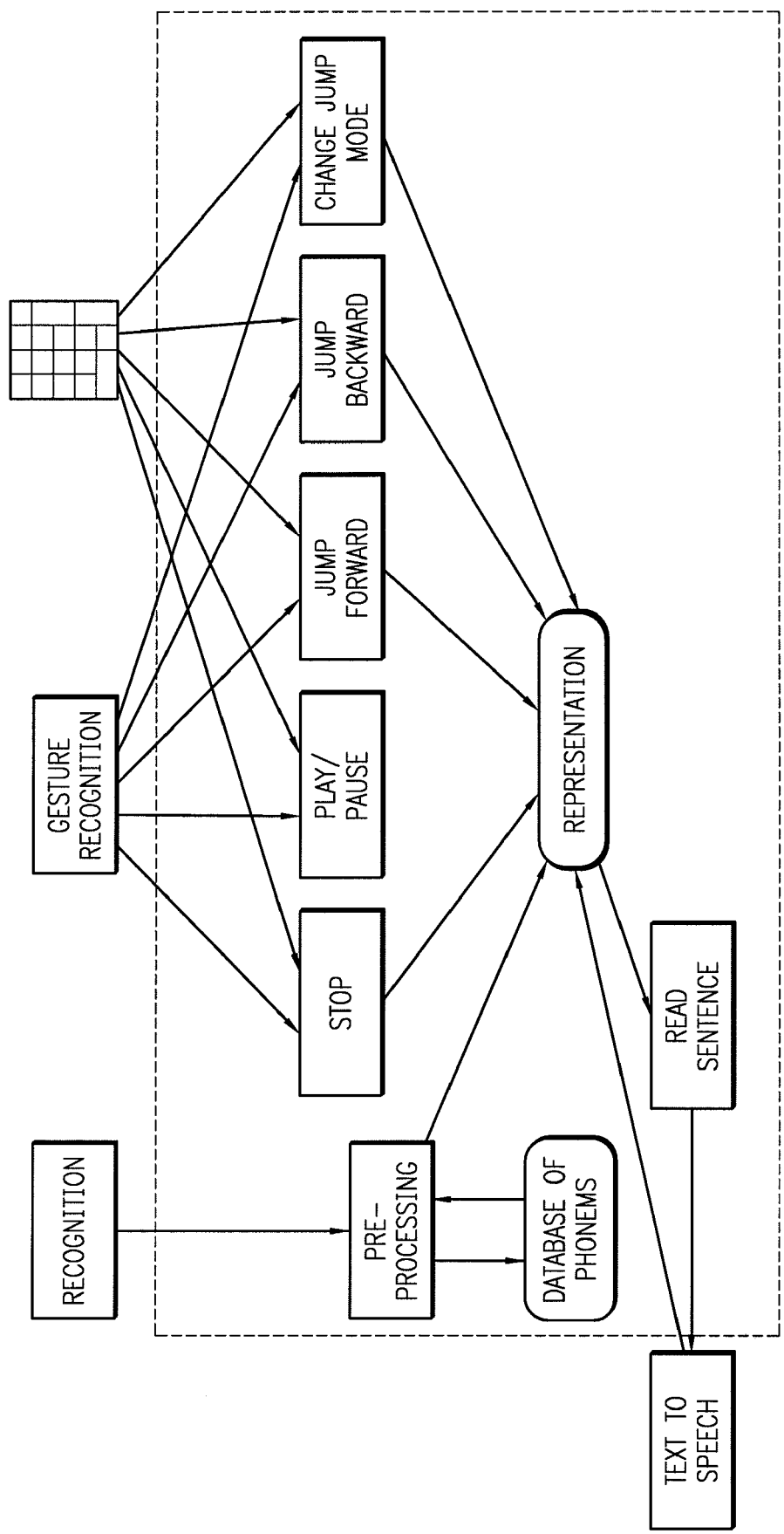
FIG. 25 is a schematic diagram of a still further functional principle of the reading device according to the embodiments of the present invention and the modifications thereof.
Figure 26:
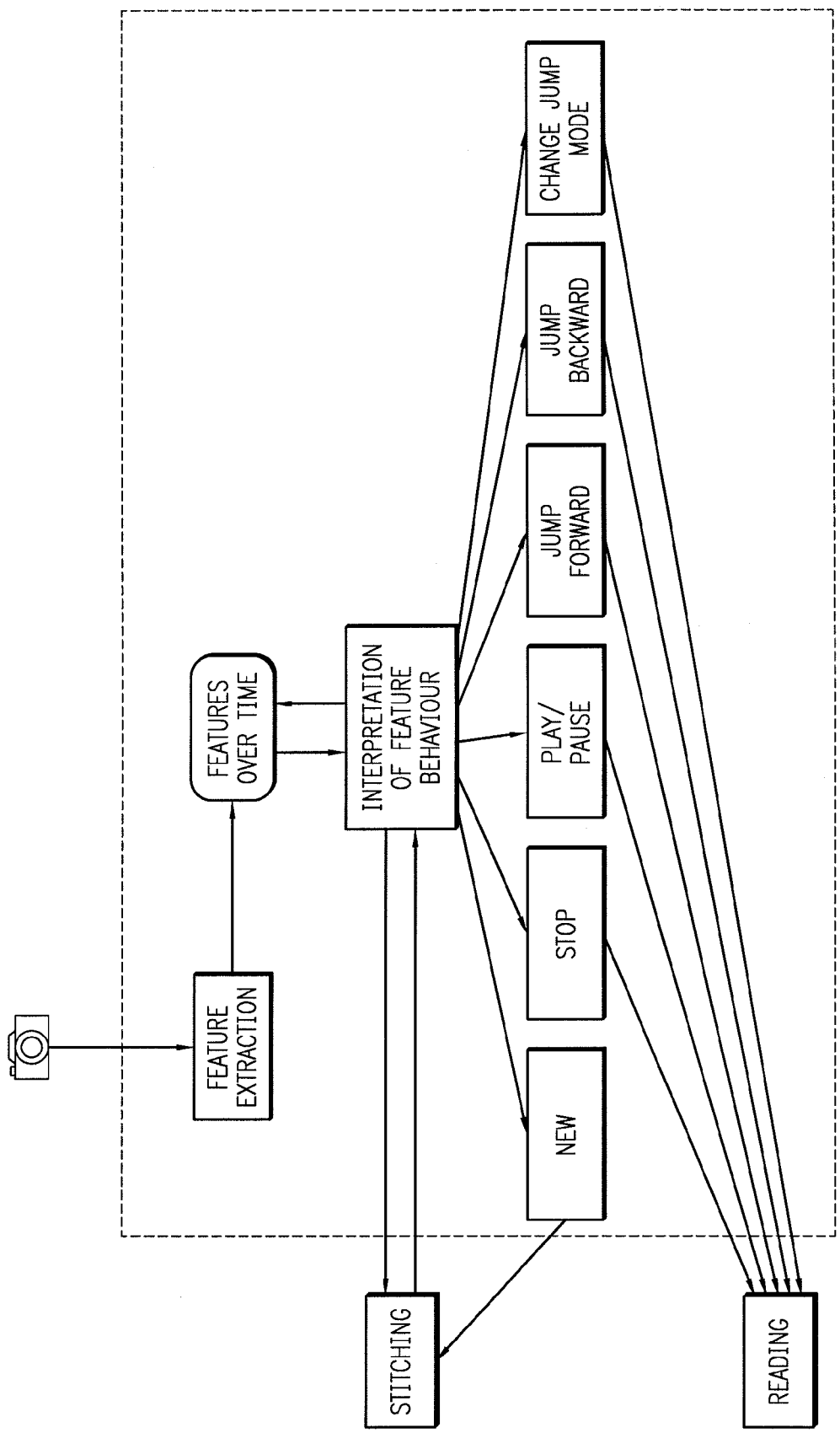
FIG. 26 is a schematic diagram of a still further functional principle of the reading device according to the embodiments of the present invention and the modifications thereof.

FIGS. 22 to 26 are schematic diagrams of a functional principle of the reading device according to the embodiments of the present invention and the modifications thereof. FIG. 22 is the overall functional principle of the reading device, FIG. 23 is schematic diagram of a more detailed functional principle of object processing, FIG. 24 is a schematic diagram of a more detailed functional principle of unwarping processing, FIG. 25 is a schematic diagram of a more detailed functional principle of reading processing and FIG. 26 is a schematic diagram of a more detailed functional principle of gesture recognition and control Since the schematic diagrams of FIGS. 22 to 26 are self-explanatory and their relations to the processing mentioned below are clearly obvious further references to FIGS. 22 to 26 are omitted here.

The image capturing unit 6 is able to capture individuals photos as well as video streams of the field of view. In the image processing unit there is performed parallel processing of a tracking process as well as of a recognition process. The results of the tracking process and the recognition process are inputted to an object managing process performed in the image processing unit.

The results of the object managing process are inputted to the text outputting unit which performs information processing and text outputting processing. In addition, there is provided a control unit which controls operation of the reading device by speech (not shown), gesture and/or buttons or switches present on the reading device.

Hereinafter, the tracking processing will be described in more detail.

The reading device locates potential text objects automatically in a time-varying scene captured by the image capturing unit 6 and tracks such potential text objects in the time-varying scene captured by the image capturing unit 6 in a targeted manner. The time-varying scene can be captured in a video mode of the image capturing unit 6. For identifying potential text objects initially merely simple heuristics are used which are essentially based on a raw recognition of layout structures, i.e. potential line and word structures. Due to the simplicity of the heuristics and the relative low effort of processing corresponding thereto such heuristics are also suitable for real-time processing and recognizing simple courses of movement of such potential text objects. A detailed recognition, whether such potential text objects are in fact text objects is performed at a subsequent stage of image processing.

Recognized potential text objects are detected and automatically tracked by tracking process on the basis of a model of a current present scene of potential text objects. Due to the variation in time in the time-varying scene captured by the image capturing unit 6 the tracked potential text objects will be detectable, besides others, in different viewing angles and in relation to image properties of each instantaneous image in different qualities, i.e. resolutions.

Each potential text object or parts thereof recognized in the time-varying scene are captured in an optimal quality, i.e. resolution and provided as a basis of a subsequent reading process. In doing so, it has to be avoided that instances of a potential text object of a good quality are replaced by instances of the same potential text object of a worse quality in the present model of the time-varying scene. This can be achieved by assigning each potential text object a number of specific metrics which represent a measure for the qualitative processability of a respective instance of the potential text object. Such metrics can typically be determined in subsequent processing steps and then be assigned the tracked potential text objects.

The model of the current present scene has to be kept consistent and complete. Therefore, new potential text objects have to be entered in the model of the time-varying scene, obsolete potential text objects have to be removed from the model of the time-varying scene and duplicates of potential text objects have to be recognized in the model of the time-varying scene. An additional time monitoring of each tracked potential text object ensures that obsolete potential text objects are not accumulated in the model of the time-varying scene and are regularly removed from the model of the time-varying scene. The model of the time-varying scene formed and maintained in this manner can be used as a basis for an interaction with the user of the reading device which can navigate through the present and consistent model of the time-varying scene of potential text objects automatically optimized for his purposes.

In addition to the aforementioned metrics of processing additional features can be assigned to each tracked potential text object in the time-varying scene which allow for a semantic assignment for a respective tracked potential text object. Semantic assignment refers to a possible classification of potential text objects in an assumed layout structure which is derived from a spatial arrangement of the captured potential text objects based on suitable template-based heuristics. For example, if a layout of a letter is recognized in the model of the tracked potential text objects attributes such as "address" or "date" can be assigned to tracked potential text objects contained therein.

The semantic assignment of tracked potential text objects allows for improving the user interface and for minimizing the effort of operating the reading device for the blind or visually impaired person which uses the same.

The following example briefly explains this approach. In a letter or an invoice there exist contents of interest and contents of non-interest. For example telephone numbers or page numbers are of minor interest for the user. The reading device therefore decides which parts are of interest and which part are of non-interest in a intelligent and autonomous manner. Potential parts of non-interest are automatically left out and only passages considered as being of interest are read in a meaningful order. By this automatism the user is not required to perform a lot of inputs otherwise required and, furthermore, the user saves much time which would otherwise be necessary for handling undesired information.

Consequently, the semantic assignment of tracked potential text objects allows for a considerably simplified navigation through an existing model of a time-varying scene of potential text objects. Therefore, for example for the reading function the user can select specified potential text objects in the model of the time-varying scene by for example control by speech, gesture or operating button or switches and it becomes possible to automatically filter specified types of text objects for a reading function by pre-adjustment.

The layout recognition mentioned above is performed on the basis of layout templates, which are provided in a database. Each layout template defines a layout as a simple geometric arrangement of possible text objects which are provided with a label. The layout templates may describe generic and/or specific layouts. Generic layouts can be applied to arbitrary text contents and specific templates are derived from known layouts such as business letters of well-known companies. The layout which fits best to a specific text object of the scene to be considered is searched for in the database using simple search algorithms and subsequently used for the specific text object. The assignment of the labels of a identified layout which fits best to a tracked potential text object can normally be performed autonomously.

Hereinafter, the recognition processing will be described in more detail.

The model of a present scene of potential text objects is subjected to a continuous optimizing process which is supplied with continuously updated image information from the environment captured by the image capturing unit 6.

The instantaneous photos captured by the image capturing unit 6 of a scene are further processed in a complex image processing process for preparing the same for a text recognition and text reading function which is optimized as much as possible. The basis for this further processing are the image data obtained by the image capturing unit 6.

The recognition processing comprises three processing steps, each of which provides a specific intermediate result for the whole recognition processing.

The first processing step mainly serves for a raw preprocessing of the image data as a basis for the actual recognition of text objects. The first processing step comprises separation of foreground and background of the image as well as application of specific filtering processes, to already recognize raw layout structures in the present image. These two parts can be performed on the basis of well-known processes. Contrary to this, a third essential part of this step is converting of the pixels of the present image in a kind of vector field. This is done by so-called local PCA (principal component analysis) which assigns additional features such as "orientation" and "quality" to each original (black) pixel. This additional information plays an important role in all further processing steps.

In the second processing step text blocks are recognized on the basis of the formed vector field. Pixel having similar properties are merged to larger units which are called orientation regions. In addition, in an iterative process orientation regions having similar properties and abutting against each other or overlapping each other are always newly merged. This results in objects having a complex envelope which describe arbitrary pixel regions on the original image and identify text passages with high probability. Such potential text objects can be isolated and, for an optimal further processing, again recursively processed using the first and second processing steps.

In the third processing step further optimizing of the isolated text blocks is performed after which the isolated text blocks are subjected to a known OCR processing. This optimization is performed by recognizing and removing of distortions on the level of text blocks as well as on the level of individual lines. Such distortions would otherwise considerably reduce the quality of OCR processing. Therefore, this multilevel distortion optimizes the reading quality of the reading device. As a result of the third processing step, readable text is present which is generated by the OCR processing used on the basis of the distorted text blocks with high quality.

During the above described three processing steps there is step-by-step formed a hierarchical model of firstly orientation regions, then text blocks and finally readable texts beginning from the original pixel information of the image. The above described tracking processing provides elements of this model always up-to-date and in optimal quality for the subsequent processing process. This requires that such elements are recognized in processing as early as possible which are contained in the model. If such elements comprise improved properties for OCR processing such elements can replace or improve existing elements of the model.

Correlation of present elements of the model with newly detected image elements is preferably performed on the basis of text-based features such as character features such as points, letters or whole correlation (or connected) components. There is used a heuristic process using specific properties of correlation components such as size, pixel density, orientation, dimension or the like as well as geometric arrangement between identified correlation components for recognizing of text blocks.

Successful recognition of text blocks is assisted in that text blocks are recognized based on classical features of texts from the very beginning. Therefore, the number of features for each image is limited and recognition using several additional features can be handled. The actual recognition within the amount of already provided texts is based on a known RANSAC (random sample consensus) algorithm.

Recognition of already earlier processed instances of elements of the model is advantageous in that information already obtained in a earlier processing can always also applied for improved further processing of image data relating thereto.

This can not only be applied to newly inputted image data but also to already present and already processed image data. In this manner possibly considerably better OCR and reading qualities are achieved on the basis of a single scene of tracked potential text objects.

In the following the first to third processing steps mentioned above will be described in further detail.

The following sub-steps are performed during the first processing step.

The scene obtained from the image capturing unit 6 in the form of image data is stored and is further converted to minimized versions whilst geometric proportions are maintained. This is called multi-scale representation and known in the art.

All levels of the hierarchical model are binarized using a quantile linear algorithm. By doing so, foreground and background of images are separated.

In the binarized image obtained a preferred "direction" of pixel information is determined using an edge filter such as an enhanced Sobel filter. In the case of the enhanced Sobel filter the enhanced Sobel filter is applied to all four directions. The preferred direction is determined as the direction which minimizes the number of correlation components. In addition, an edge image is obtained in which all four directions are put over each other. This corresponds to compression and assists in rapid calculation of the correlation components which are subsequently used. As a result of this processing to inverted edge images are obtained which have to be again inverted for further processing. Therefore, the direction of text flow is enhanced and emphasized.

Instead the enhanced Sobel filter several filter masks can be used to obtain a main rotation of a text document. For example, the eight filter masks of the so-called Kirsch filter can be individually applied to the binarized image. Subsequently, it is decided which image is used for further processing based on the number of correlation components. The image used is the image having a minimal number of correlation components. The accuracy of orientations can be enhanced using further masks.

Black pixels of the resulting image are converted to vectors having orientation and length. These vectors are clustered in dependency of their correlation components. In local PCA analysis orientation of text lines in the edge image is determined, firstly on a small version of the image. Here, vectors in a predetermined neighbourhood within the correlation component belonging to the vectors are considered and a main direction is determined using PCA. This orientation of the vectors shows the preferred direction of a pixel in relation to the direct neighbourhood thereof, i.e. in which direction most black pixel occur. The length of vectors is a measure of quality of the determined preferred direction. This proceeds in dependency of already processed regions within the hierarchical model and provides corresponding information about text direction, text size and potential text regions. The resulting vector fields are intermediate results of the first processing step.

In the second processing step, on the basis of vector fields determined in the first processing step regions of pixel clusters connected with each other and additionally comprising the same preferred direction are determined. Such pixel clusters are merged to so-called orientation regions and subsequently merely considered as a whole. An orientation region contains as properties the preferred direction of pixels assigned thereto, a mean quality as well as an density which is determined from the ratio of black to white pixels in the scene considered.

Orientation regions having same preferred directions within direct neighbourhood as well as overlapping orientation regions having different preferred directions are merged to new greater orientation regions.

Orientation regions which are considered as being to small are removed. In this manner, noise components present in the image are effectively removed from further consideration.

Due to information reduction achieved by applying an edge filter orientation regions about corresponding correlation components which have been already calculated in choosing the direction are enhanced.

Thus obtained orientation regions are enhanced in all directions such that as a whole a convex envelope is achieved. Orientation regions which are connected with each other are again merged. These orientation regions are again enhanced to a convex envelope. This is done until only convex envelopes which are not connected with each other are remaining.

The remaining orientation regions (or the pixel regions corresponding thereto) are identified in the original image and extracted. The extracted regions are roughly vertically aligned based on orientation and then enhanced to a rectangular form. The resulting rectangular pixel blocks are designated as text blocks.

In the third processing step, for distortion or unwarping X and Y components of a mesh are calculated and this mesh is tranformed using an adapted TPS (thin plate spline) method. The advantage of TPS against other standard methods is an evenly continuing transformation function.

To the text blocks the process mentioned above for determining orientation is again applied. Many calculation savings are possible because for example orientation is known and an edge filter has to be applied only from the Y direction.

Subsequently, the image is divided in vertical stripes and candidate points for local maxima which are given by edges of lines are determined. This points in dependency of orientation at this points result in point sequences which correspond to course of text lines. These sequences of lines are represented by an adapted Sizer method by uniform, slightly smoothed functions which are additionally correlated in dependency of local surrounding Sizer functions. There result lines which are merely defined within start and end point.

Subsequently, derivatives of these functions in uniform distances are measured and these are used as representation volume of the TPS method. From the pixels of the isolated text block approximate course of each line of the assumed text in X direction is approximated.

As a result, a TPS function is achieved which approximates orientation for each pixel.

The same is done in Y direction based on orientations of letters. Local PCA determines the main axes of the letters. Subsequently, these are clustered and provide a new representation volume for the TPS method.

The two TPS functions obtained are used to form a uniform mesh. The X component of the TPS function is passed through the function beginning from the left. The value of the function changes in dependency of the given orientations. As to the Y component of the TPS function the functions are passed through the second TPS function from the top to the bottom.

The intersections of the function are the intersections of the mesh to be distorted.

The text block which is distorted or unwarped in X and Y direction is supplied to OCR processing and converted in readable text.

In more detail, after unwarping standard methods such as contrast improvement and sharpening are applied to text blocks and thereafter the text blocks are compared with present types of text objects. If a present version is available the text blocks are stitched with so-called stitching methods such as quality stitching. The new versions of the text blocks are subjected to OCR processing. If it is determined by the OCR processing that the text objects are in fact not text objects the tracked text objects are marked or labelled. If the document was not already present, the document is stored in the database and the tracked text objects are newly marked or labelled correspondingly.

Although the present invention has been described above as a reading device having specific functionalities which are especially performed by software, it should be noted that the specific functionalities regarding all aspects of the aforementioned methods of image processing comprising for example image capturing, object tracking, unwarping, controlling or the like described above represent alone subject matters according to the present invention, for which applicant reserves the right to prosecute them separated from the hardware structure of the reading device described above by for example filing one or more divisional applications, one or more continuation applications or one or more continuation-in part applications.

Although the present invention has been described in connection with certain specific embodiments for instructional purposes, the present invention is not limited thereto. Accordingly, various modifications, adaptations and combinations of various features of the described embodiments can be practiced without departing from the scope of the present invention as set forth in the accompanying claims.

What is claimed is:

1. A reading device for blind or visually impaired persons for recognizing and reading text passages, comprising:
    an image capturing unit being configured to capture an image of an environment of a blind or visually impaired person and to output image data corresponding thereto;
    an image processing unit being configured to process the image data such that text is recognized and extracted from the image data and to output text data corresponding thereto;
    a text outputting unit being configured to output data corresponding to the text data in a form noticeable or convertible to be noticeable by the blind or visually impaired person;
    a housing comprising a first part and a second part, the first part having the image capturing unit attached thereto and the second part accommodating the image processing unit and the text outputting unit; and
    an adjusting unit coupling the first part and the second part of the housing with each other and being configured to define an operating position in which the first part of the housing is spaced apart the second part of the housing and a non-operating position in which the first part of the housing abuts against the second part of the housing to accommodate the image capturing unit, the image processing unit and the text outputting unit in the housing.

2. The reading device according to claim 1, wherein the housing comprises a third part rotatably attached to the second part of the housing and configured to define a support of the housing.

3. The reading device according to claim 1, wherein the adjusting unit is a telescopic pullout configured to slidably adjust a position of the first part of the housing.

4. The reading device according to claim 3, wherein an amount of slidable adjustment of the position of the first part of the housing defines a size of a capturing area of the image capturing unit in the operating position.

5. The reading device according to claim 1, wherein operating switches are present at the second part of the housing.

6. The reading device according to claim 1, wherein the image capturing unit is a camera module.

7. The reading device according to claim 6, wherein the camera module is an array comprising a plurality of CCD or CMOS modules.

8. The reading device according to claim 1, wherein the image capturing unit is movable.

9. The reading device according to claim 1, wherein control of operation is performed by at least one of speech and gesture.

10. The reading device according to claim 1, wherein the image capturing unit is configured to capture individual pictures of an environment of the blind or visually impaired person.

11. The reading device according to claim 1, wherein the image capturing unit is configured to capture video streams of an environment of the blind or visually impaired person.

12. The reading device according to claim 11, wherein the image processing unit is configured to perform the step of locating potential text objects in captured video streams and tracking the potential text objects in a time-varying scene of the captured video streams.

13. The reading device according to claim 1, wherein the image processing unit is configured to perform stitching of a plural images captured by the image capturing unit to form an overall and a high-resolution image.

14. A reading device for blind or visually impaired persons for recognizing and reading text passages, comprising:
    an image capturing unit being configured to capture an image of an environment of a blind or visually impaired person and to output image data corresponding thereto;
    an image processing unit being configured to process the image data such that text is recognized and extracted from the image data and to output text data corresponding thereto;
    a text outputting unit being configured to output data corresponding to the text data in a form noticeable or convertible to be noticeable by the blind or visually impaired person;
    a housing comprising a first part and a second part, the first part having the image capturing unit attached thereto and the second part accommodating the image processing unit and the text outputting unit; and
    an adjusting unit coupling the first part and the second part of the housing with each other and being configured to define an operating position in which the first part of the housing is spaced apart the second part of the housing and a non-operating position in which the first part of the housing abuts against the second part of the housing to accommodate the image capturing unit, the image processing unit and the text outputting unit in the housing,
    wherein the image processing unit is configured to assign features to recognized text objects for allowing semantic assignment of the recognized text objects to an assumed layout structure.

15. The reading device according to claim 14, wherein the assumed layout structure is derived from spatial arrangement of the recognized text objects based on template-based heuristics.

16. The reading device according to claim 15, wherein templates are stored in a database.

17. The reading device according to claim 15, wherein templates define a geometric arrangement of possible text objects.

18. The reading device according to claim 14, wherein the recognized text objects are subject to unwarping.

19. The reading device according to claim 14, wherein the housing comprises a third part rotatably attached to the second part of the housing and configured to define a support of the housing.

20. The reading device according to claim 19, wherein the adjusting unit is a telescopic pullout configured to slidably adjust a position of the first part of the housing.

21. The reading device according to claim 20, wherein an amount of slidable adjustment of the position of the first part of the housing defines a size of a capturing area of the image capturing unit in the operating position.

22. The reading device according to claim 14, wherein operating switches are present at the second part of the housing.

23. The reading device according to claim 14, wherein the image capturing unit is a camera module.

24. The reading device according to claim 23, wherein the camera module is an array comprising a plurality of CCD or CMOS modules.

25. The reading device according to claim 14, wherein the image capturing unit is movable.

26. The reading device according to claim 14, wherein control of operation is performed by at least one of speech and gesture.

27. The reading device according to claim 14, wherein the image capturing unit is configured to capture individual pictures of an environment of blind or visually impaired person.

28. The reading device according to claim 14, wherein the image capturing unit is configured to capture video streams of an environment of the blind or visually impaired person.

29. The reading device according to claim 28, wherein the image processing unit is configured to perform the step of locating potential text objects in captured video streams and tracking the potential text objects in a time-varying scene of the captured video streams.

30. The reading device according to claim 14, wherein the image processing unit is configured to perform stitching of a plural images captured by the image capturing unit to form an overall and a high-resolution image.

* * * * *